United States Patent
Dzindo

(10) Patent No.: US 10,400,466 B2
(45) Date of Patent: *Sep. 3, 2019

(54) HYBRID HEATER

(71) Applicant: Pentair Water Pool and Spa, Inc., Cary, NC (US)

(72) Inventor: Azur Dzindo, Topanga, CA (US)

(73) Assignee: Pentair Water Pool and Spa, Inc., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/676,841

(22) Filed: Aug. 14, 2017

(65) Prior Publication Data

US 2017/0342732 A1   Nov. 30, 2017

Related U.S. Application Data

(63) Continuation of application No. 14/746,403, filed on Jun. 22, 2015, now Pat. No. 9,732,536.
(Continued)

(51) Int. Cl.
| | |
|---|---|
| *E04H 4/12* | (2006.01) |
| *F24H 1/10* | (2006.01) |
| *F24H 9/20* | (2006.01) |
| *F24H 9/12* | (2006.01) |
| *F24D 15/04* | (2006.01) |
| *F24H 1/12* | (2006.01) |

(Continued)

(52) U.S. Cl.
CPC ......... *E04H 4/129* (2013.01); *A61H 33/0095* (2013.01); *F24D 15/04* (2013.01); *F24H 1/101* (2013.01); *F24H 1/107* (2013.01); *F24H 1/124* (2013.01); *F24H 1/165* (2013.01); *F24H 4/02* (2013.01); *F24H 9/128* (2013.01); *F24H 9/2028* (2013.01); *A61H 2201/0207* (2013.01); *A61H 2201/5038* (2013.01); *A61H 2201/5058* (2013.01); *A61H 2201/5082* (2013.01); *A61H 2201/5097* (2013.01); *F24H 2210/00* (2013.01); *F24H 2220/00* (2013.01); *F24H 2250/00* (2013.01); *Y02B 30/12* (2013.01)

(58) Field of Classification Search
CPC ..................................................... E04H 4/129
USPC ................................................... 4/488–513
See application file for complete search history.

(56) References Cited

U.S. PATENT DOCUMENTS

| | | |
|---|---|---|
| 4,178,988 A | 12/1979 | Cann et al. |
| 4,291,833 A | 9/1981 | Franchina |

(Continued)

FOREIGN PATENT DOCUMENTS

| | | |
|---|---|---|
| CN | 101210719 A | 7/2008 |
| CN | 201819409 U | 5/2011 |

(Continued)

*Primary Examiner* — Lori L Baker
(74) *Attorney, Agent, or Firm* — Quarles & Brady LLP

(57) ABSTRACT

A heater including a housing, a first tankless heater, a second tankless heater, a first and second flow directing elements, the first flow directing element in communication with the first tankless heater and the second flow directing element and the second flow directing element in communication with the second tankless heater, and a controller in communication with the first and second tankless heaters and the first and second flow directing elements, the controller configured to control the first and second flow directing elements to control flow to one or both of the first and second tankless heaters.

20 Claims, 19 Drawing Sheets

Related U.S. Application Data

(60) Provisional application No. 62/015,106, filed on Jun. 20, 2014.

(51) Int. Cl.
*F24H 1/16* (2006.01)
*F24H 4/02* (2006.01)
*A61H 33/00* (2006.01)

(56) References Cited

U.S. PATENT DOCUMENTS

| | | |
|---|---|---|
| 4,474,227 A | 10/1984 | Reedy |
| 4,476,920 A | 10/1984 | Drucker et al. |
| 4,738,394 A | 4/1988 | Ripka et al. |
| 4,971,136 A | 11/1990 | Mathur et al. |
| 5,289,362 A | 2/1994 | Liebl et al. |
| 5,504,306 A | 4/1996 | Russell et al. |
| 5,509,274 A | 4/1996 | Lackstrom |
| 5,700,993 A | 12/1997 | Counsell et al. |
| 5,805,856 A | 9/1998 | Hanson |
| 5,967,411 A | 10/1999 | Perry et al. |
| 6,149,066 A | 11/2000 | Perry et al. |
| 6,213,405 B1 | 4/2001 | Spiegel |
| 6,439,469 B1 | 8/2002 | Gruber et al. |
| 6,640,047 B2 | 10/2003 | Murahashi et al. |
| 6,676,831 B2 | 1/2004 | Wolfe |
| 6,785,630 B2 | 8/2004 | Kolk et al. |
| 6,904,873 B1 | 6/2005 | Ashton |
| 6,909,843 B1 | 6/2005 | Fabrizio |
| 7,043,341 B2 | 5/2006 | Gallupe et al. |
| 7,046,922 B1 | 5/2006 | Sturm et al. |
| 7,243,004 B2 | 7/2007 | Shah et al. |
| 7,243,044 B2 | 7/2007 | McCalla |
| 7,506,616 B2 | 3/2009 | Calvert |
| 7,647,137 B2 | 1/2010 | Schindler |
| 7,823,799 B2 | 11/2010 | Sakai et al. |
| 7,848,853 B2 | 12/2010 | Milder et al. |
| 8,041,461 B2 | 10/2011 | Milder et al. |
| 8,041,462 B2 | 10/2011 | Milder et al. |
| 8,126,595 B2 | 2/2012 | Milder et al. |
| 8,280,236 B2 | 10/2012 | Fabrizio |
| 8,370,001 B2 | 2/2013 | Love |
| 8,422,870 B2 | 4/2013 | Nelson et al. |
| 8,498,523 B2 | 7/2013 | Deivasigamani et al. |
| 8,577,507 B2 | 11/2013 | Milder et al. |
| 8,600,563 B2 | 12/2013 | Ben-Yaacov et al. |
| 8,640,474 B2 | 2/2014 | Ackner et al. |
| 8,755,943 B2 | 6/2014 | Wenzel |
| 9,068,767 B2 | 6/2015 | Lesage et al. |
| 9,127,866 B2 | 9/2015 | Ben-Yaacov et al. |
| 9,151,506 B2 | 10/2015 | Ru et al. |
| 9,200,811 B2 | 12/2015 | Lifson et al. |
| 9,244,445 B2 | 1/2016 | Finch et al. |
| 9,256,702 B2 | 2/2016 | Elbsat et al. |
| 9,298,203 B2 | 3/2016 | Wenzel |
| 9,341,383 B2 | 5/2016 | Aspeslagh et al. |
| 9,732,536 B2 * | 8/2017 | Dzindo .................. E04H 4/129 |
| 2003/0036820 A1 | 2/2003 | Yellepeddy et al. |
| 2004/0024717 A1 | 2/2004 | Sneeringer |
| 2004/0128266 A1 | 7/2004 | Yellepeddy et al. |
| 2006/0027673 A1 | 2/2006 | Fabrizio |
| 2006/0065750 A1 | 3/2006 | Fairless |
| 2007/0112694 A1 | 5/2007 | Metcalfe |
| 2007/0154856 A1 | 7/2007 | Hallit et al. |
| 2007/0244576 A1 | 10/2007 | Potucek et al. |
| 2008/0023564 A1 | 1/2008 | Hall |
| 2009/0012651 A1 | 1/2009 | Lifson et al. |
| 2009/0159076 A1 | 6/2009 | Zheng |
| 2009/0159259 A1 | 6/2009 | Sinha |
| 2009/0171862 A1 | 7/2009 | Harrod et al. |
| 2009/0234513 A1 | 9/2009 | Wiggins |
| 2010/0012293 A1 | 1/2010 | Sinha et al. |
| 2010/0021149 A1 | 1/2010 | Mulder et al. |
| 2011/0008030 A1 | 1/2011 | Luo et al. |
| 2011/0048404 A1 | 3/2011 | Lee |
| 2011/0286727 A1 | 11/2011 | Johnson |
| 2012/0090559 A1 | 4/2012 | Yan |
| 2013/0042635 A1 | 2/2013 | Nelson et al. |
| 2013/0091883 A1 | 4/2013 | Perez et al. |
| 2013/0094840 A1 | 4/2013 | Seitz et al. |
| 2013/0266295 A1 | 10/2013 | Kreutzman |
| 2013/0312671 A1 | 11/2013 | Deivasigamani et al. |
| 2014/0023352 A1 | 1/2014 | Jurczyszak et al. |
| 2014/0156102 A1 | 6/2014 | Elbaz et al. |
| 2015/0090803 A1 | 4/2015 | Okamoto et al. |
| 2015/0167989 A1 | 6/2015 | Matsouoka et al. |
| 2015/0219343 A1 | 8/2015 | Moriwaki et al. |
| 2015/0368921 A1 | 12/2015 | Dzindo |
| 2016/0109866 A1 | 4/2016 | Elbsat et al. |
| 2016/0178234 A1 | 6/2016 | Hayden et al. |
| 2016/0195866 A1 | 7/2016 | Turney et al. |

FOREIGN PATENT DOCUMENTS

| | | |
|---|---|---|
| CN | 202485275 U | 10/2012 |
| EP | 0193482 A1 | 9/1986 |
| FR | 2765671 A1 | 1/1999 |
| JP | 2011027368 A | 2/2011 |
| WO | 2005067617 A2 | 7/2005 |
| WO | 2005106346 A1 | 11/2005 |
| WO | 2007004460 A1 | 1/2007 |
| WO | 2007046792 A1 | 4/2007 |
| WO | 2007095087 A2 | 8/2007 |
| WO | 2007109829 A1 | 10/2007 |
| WO | 2007117246 A1 | 10/2007 |
| WO | 2012077333 A2 | 6/2012 |
| WO | 2012162763 A1 | 12/2012 |
| WO | 2013001915 A1 | 1/2013 |
| WO | 2013131129 A1 | 9/2013 |
| WO | 2015025585 A1 | 2/2015 |
| WO | 2015196198 A1 | 12/2015 |

* cited by examiner

HYBRID HEATER

CROSS REFERENCE TO RELATED APPLICATIONS

The present application is a continuation of U.S. application Ser. No. 14/746,403, filed on Jun. 22, 2015, which claims the benefit of U.S. Provisional Application Ser. No. 62/015,106, filed on Jun. 20, 2014, the disclosures of which are incorporated by reference herein in their entirety.

BACKGROUND

Swimming pools and spas are popular with consumers in a wide variety of environments. The type of pool or spa and the environment in which the pool or spa is operating in changes the user requirements for maintaining a pleasant experience. The temperature of the water in the pool or spa is one parameter that can be controlled that impacts the user experience when swimming in a pool or relaxing in a spa.

Water heaters for all types of applications are well known in the art. With the wide variety of conditions, many different types of pool heaters have been developed that use different sources of energy to heat pool water. Different types of heaters that consume electricity or gas have certain advantages and disadvantages depending on the environmental conditions. For example, traditional gas burning heaters may respond quickly to change the water temperature, but require a dedicated gas supply that may not be present in many warmer climate regions. In contrast, electrically powered heat pumps can be configured to be very efficient in warmer climates. However, the response time to heat the pool or spa water may be slower, and in cold conditions, the efficiency is dramatically reduced. Many pool operators that are faced with a variety of environmental conditions have opted to install separate energy source heaters to provide a heating unit that is appropriate for different conditions. This solution is less than ideal. More space is required to install two or more heaters with each usually having a separate controller. With separate controllers, the user or operator must make the decision of which system to use and must manually determine the most efficient operating schedule.

Therefore, there is a need in the art for a single, self-contained unit that is adapted to be controlled by a single programmable controller to operate multiple energy source heaters in a single housing to provide flexibility and cost effective heating.

SUMMARY

Some embodiments of the invention provide a hybrid heater that includes a housing, a first tankless heater, a second tankless heater, and first and second flow directing elements, the first flow directing element in communication with the first tankless heater and the second flow directing element and the second flow directing element in communication with the second tankless heater, wherein the first flow directing element is configured to direct flow in one of the following manners at any given time: (1) only to the first tankless heater, (2) to the second flow directing element and, thus, the second tankless heater and bypassing the first tankless heater, or (3) to the first tankless heater and the second flow directing element.

In some embodiments, the first tankless heater is mounted to the housing and the second tankless heater is mounted within the housing.

In some embodiments, both the first tankless heater and the second tankless heater are mounted within the housing.

In some embodiments, the first tankless heater is an electric heat pump and the second tankless heater is a gas fired heat exchanger.

In some embodiments, the heather includes a controller configured to monitor a temperature of water entering an inlet of the heater and controls the first and second flow directing elements dependent upon the temperature of the water entering the inlet.

In some embodiments, the second flow directing element is configured to direct flow in one of the following manners at any given time: (1) only to the second tankless heater or (2) only to a bypass pipe, which bypasses the second tankless heater.

In some embodiments, the first and second flow directing elements are valves.

In some embodiments, the first and second flow valves are spring-loaded check valves.

In some embodiments, the first and second valves are three-way valves.

In some embodiments, the heater includes a single inlet entering the housing and in communication with both the first and second tankless heaters and a single outlet exiting the housing and in communication with both the first and second tankless heaters.

Some embodiments of the invention provide a hybrid heater that includes a housing, a first tankless heater, a second tankless heater, first and second flow directing elements, the first flow directing element in communication with the first tankless heater and the second flow directing element and the second flow directing element in communication with the second tankless heater, and a controller in communication with the first and second tankless heaters and the first and second flow directing elements, the controller configured to control the first and second flow directing elements to control flow to one or both of the first and second tankless heaters.

In some embodiments, the controller is configured to receive input signals relating to environmental conditions around the heater and an aquatic system in which the heater is installed.

In some embodiments, the controller may be programmed remotely by a user.

In some embodiments, the controller is configured to communicate with at least one component of an aquatic system in which the heater is installed.

In some embodiments, both the first tankless heater and the second tankless heater are mounted within the housing.

In some embodiments, first tankless heater is an electric heat pump and the second tankless heater is a gas fired heat exchanger.

In some embodiments, the controller is configured to monitor a temperature of water entering an inlet of the heater and controls the first and second flow directing elements dependent upon the temperature of the water entering the inlet.

In some embodiments, the first flow directing element is configured to direct flow in one of the following manners at any given time: (1) only to the first tankless heater, (2) to the second flow directing element and, thus, the second tankless heater and bypassing the first tankless heater, or (3) to the first tankless heater and the second flow directing element and the second flow directing element is configured to direct flow in one of the following manners at any given time: (1) only to the second tankless heater or (2) only to a bypass pipe, which bypasses the second tankless heater.

In some embodiments, the first and second flow directing elements are valves.

In some embodiments, the heater further includes a single inlet entering the housing and in communication with both the first and second tankless heaters and a single outlet exiting the housing and in communication with both the first and second tankless heaters.

DETAILED DESCRIPTION

Figure 1:
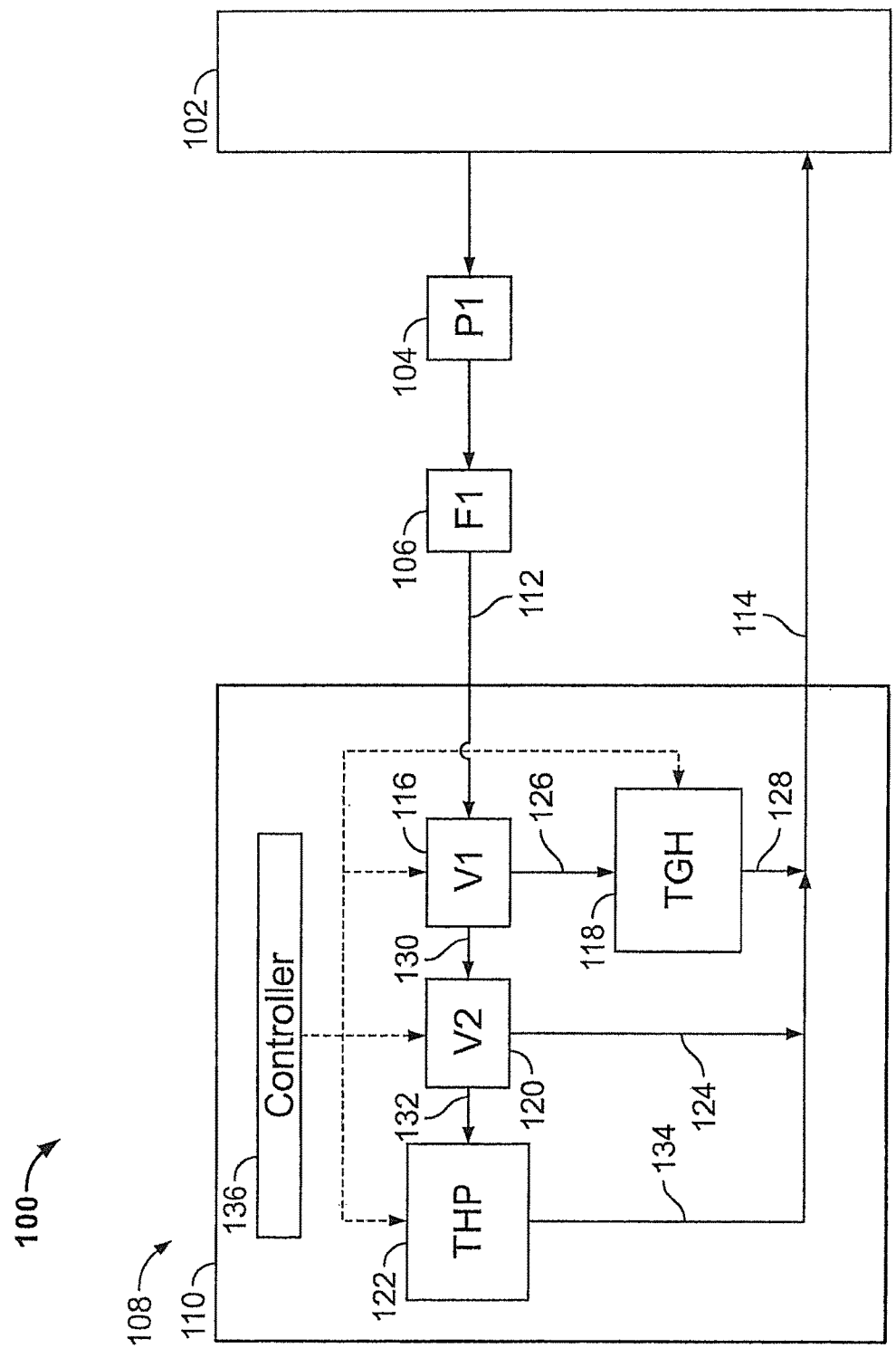
FIG. 1 is a schematic view of an aquatic system having a hybrid heater according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

The embodiments described below pertain to a tankless hybrid water heater. Specifically, the tankless heater includes a first gas burning heater and a second electrically powered heat pump that may be used to heat water for a pool, spa, or other aquatic application. The tankless hybrid water heater employs a single housing with two different types of heaters and includes a programmable controller.

The embodiments of the present disclosure include numerous advantages over the prior art. For example, one advantage is two different types of heaters being provided in a single housing. By providing two different types of heaters in one device, the space required for installation may be significantly reduced when compared to installing two separate heaters. Another advantage is use of a single programmable controller that can utilize the different heaters in a variety of operational modes. Thus, the embodiments of the present disclosure are capable of providing significantly improved performance with respect to energy consumption and response time as desired by the operator of the tankless hybrid water heater.

Referring to FIG. 1, a schematic diagram of an aquatic system 100 is depicted. A pool, spa, or other aquatic application 102 is connected to a pump 104 (P1), which is in fluid communication with a filter 106 (F1) and a tankless hybrid heater 108. The aquatic application 102, the pump 104, the filter 106, and the hybrid heater 108 are connected by a series of pipes represented by arrows in FIG. 1. It is contemplated that one having ordinary skill in the art would understand that the embodiment of the aquatic system 100, and all of the components described therein, provided in the present disclosure may be configured in many different ways not specifically disclosed herein.

Still referring to FIG. 1, the hybrid heater 108 includes a housing 110, which further includes an inlet 112 and an outlet 114. The inlet 112 is in fluid communication with the filter 106 and the outlet 114 is in fluid communication with the aquatic application 102. The hybrid heater 108 also includes a first valve 116 (V1) that is in fluid communication with the inlet 112. The first valve 116 is also in fluid communication with a tankless gas heater 118 (TGH) and/or a second valve 120 (V2). The second valve 120 is further in fluid communication with a tankless electric heat pump 122

(THP) and/or a by-pass pipe 124. The tankless gas heater 118 includes a gas heater inlet pipe 126 and a gas heater outlet pipe 128. The gas heater inlet pipe 126 is in fluid communication with the first valve 116. The gas heater outlet pipe 128 is in fluid communication with the outlet 114. The first valve 116 is in fluid communication with the second valve 120 through a transfer pipe 130. The tankless heat pump 122 includes a heat pump inlet pipe 132, which is in fluid communication with the second valve 120, and a heat pump outlet pipe 134, which is in fluid communication with the outlet 114.

As can be seen in FIG. 1, the hybrid heater 108 includes a single inlet 112 and a single outlet 114 that transport water to both the tankless gas heater 118 and the tankless heat pump 122. The first and second valves 116, 120 control the flow of water into one or both of the tankless gas heater 118 and the tankless heat pump 122 through the pipes 130, 132 and/or the by-pass pipe 124.

The hybrid heater 108 also includes a controller 136 that may be programmable and may be in communication with one or more of the first valve 116, the gas heater 118, the second valve 120, and the heat pump 122 (shown via dashed arrows in FIG. 1). The controller 136 may also be configured to communicate with all or some of the components of the aquatic system 100 external to the hybrid heater 108, such as the filter 106 and/or the pump 104. In an alternative embodiment, the hybrid heater 108 and the controller 136 may be configured to be in communication with and controlled by an external controller (not shown) that may be in communication with and controlling some or all of the other components of the aquatic system 100. Furthermore, the controller 136 may be configured to receive many different types of input signals in relating to environmental conditions around the hybrid heater 108 and the aquatic application 102 by any variety of sensors and gauges known to those having ordinary skill in the art. It is also contemplated that, in another alternative embodiment, the controller 136 may include communication capability to send and receive information via wireless technologies to different components of the aquatic system 100 or interface with a remote user. In a further alternative embodiment, the programming of the controller 136 may be performed remotely or locally by the user through a user interface (not shown).

Figure 2:
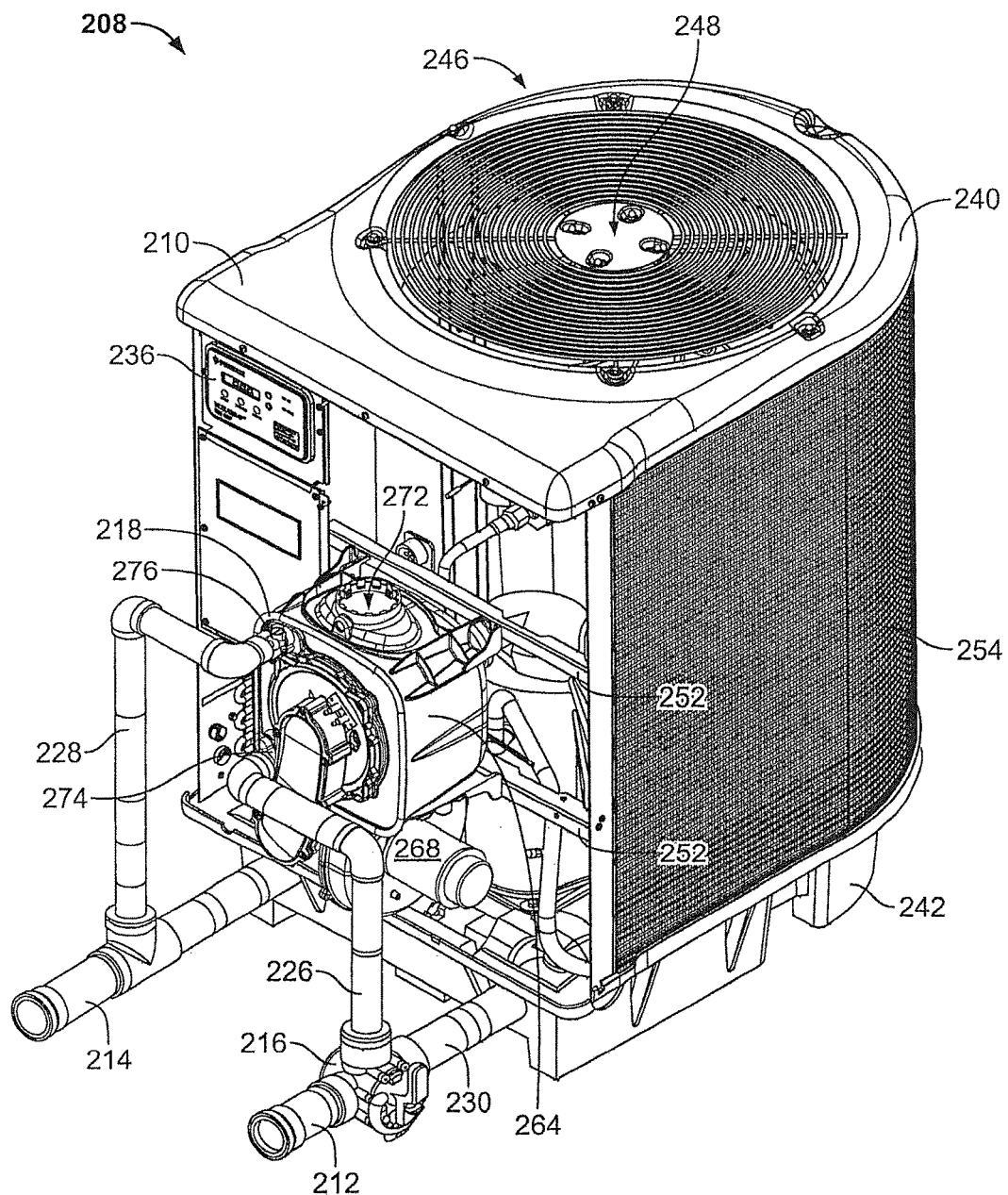
FIG. 2 is an isometric view of an embodiment of a hybrid heater.
Figure 3:
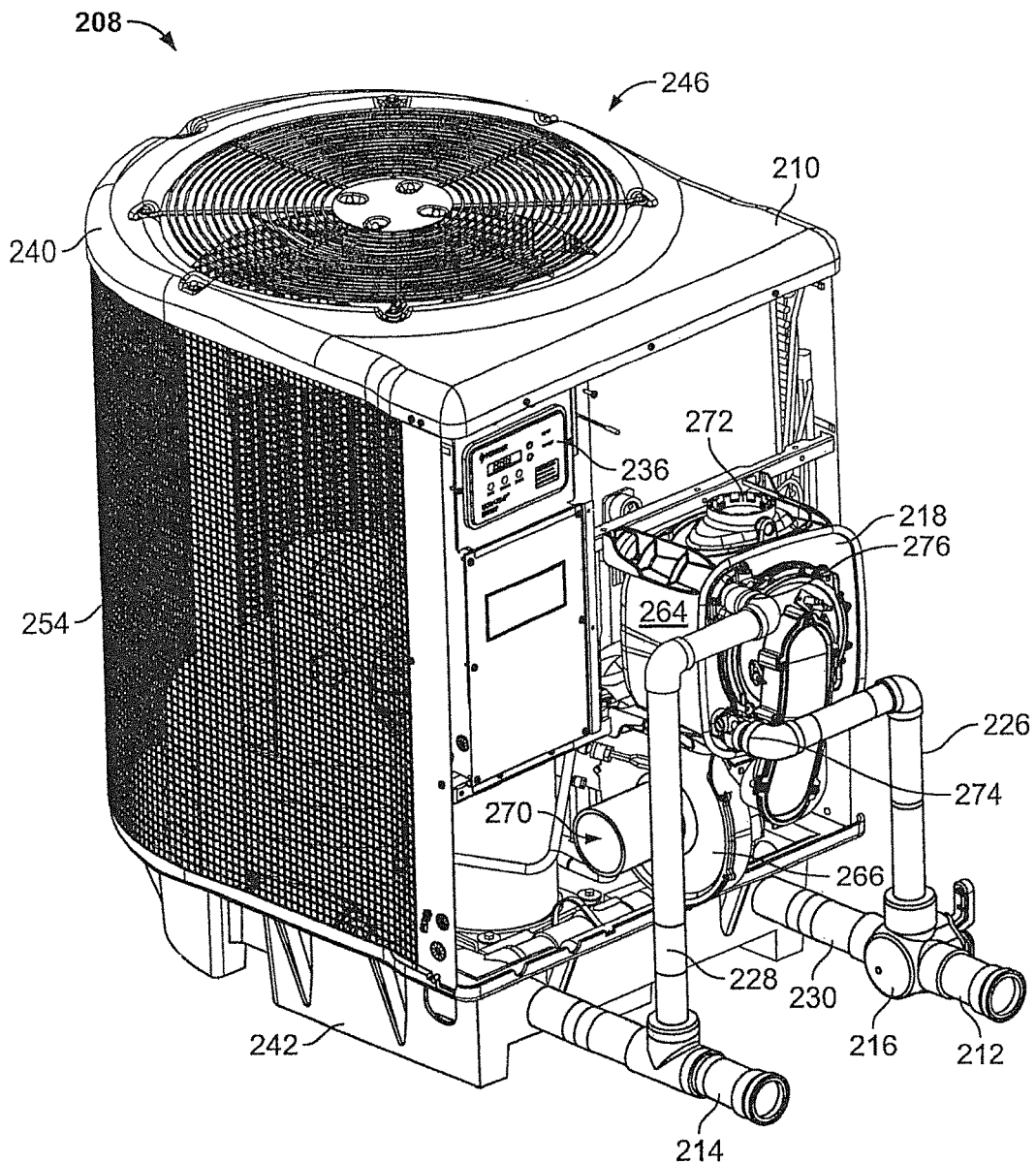
FIG. 3 is a different isometric view of the hybrid heater of FIG. 2.

Turning now to FIGS. 2 and 3, one embodiment of a tankless hybrid heater 208 is depicted. The hybrid heater 208 includes a housing 210, which further includes an inlet 212 and an outlet 214. A first valve 216 is in fluid communication with the inlet 212 and a tankless gas heater 218, and/or a second valve 220 (see FIG. 5). The second valve 220 is in fluid communication with a tankless heat pump 222 (see FIGS. 5 and 6), and/or a bypass pipe 224 (see FIG. 6). The tankless gas heater 218 includes a gas heater inlet pipe 226, which is in fluid communication with the first valve 216, and a gas heater outlet pipe 228, which is in fluid communication with the outlet 214. The first valve 216 is in fluid communication with the second valve 220 through a transfer pipe 230. The tankless heat pump 222 includes a heat pump inlet pipe 232 (see FIG. 5), which is in fluid communication with second valve 220, and a heat pump outlet pipe 234 (see FIG. 6), which is in fluid communication with the outlet 214. The hybrid heater 208 also includes a controller 236 that may be programmable and may be in communication with one or more of the first valve 216, the tankless gas heater 218, the second valve 220, and/or the tankless heat pump 222.

While the second valve 220 is described as being a valve, the second valve 220 may be any component that directs flow to the bypass pipe 224, the heat pump inlet pipe 232, or both the bypass pipe 224 and the heat pump inlet pipe 232 simultaneously. In one embodiment, the second valve 220 may be a T-elbow. In another embodiment, the second valve 220 may be a solenoid valve.

Still referring to FIGS. 2 and 3, the housing 210 includes an upper housing portion 240 and a lower housing portion 242. The upper housing portion 240 is connected to the lower housing portion 242 by two vertical supports 244 (see FIG. 4). The upper housing portion 240 defines an opening 246 to allow airflow through the housing 210. A fan guard 248 is disposed on the upper housing portion 240 across the opening 246. A fan 250 (see FIG. 4) of the heat pump 222 is supported in the opening 246 by the fan guard 248. The gas heater 218 is supported on the housing 210 by horizontal supports 252. A mesh screen 254 covers a refrigerant-to-air heat exchanger 256 (see FIG. 4) and extends from the upper housing portion 240 to the lower housing portion 242. It is contemplated that in some embodiments, the gas heater 218 and the heat pump 222 may both be contained within the housing 210. Further, in some embodiments, the housing may take different configurations to include the gas heater 218 and heat pump 222 in different configurations as understood by one having ordinary skill in the art.

Figure 4:
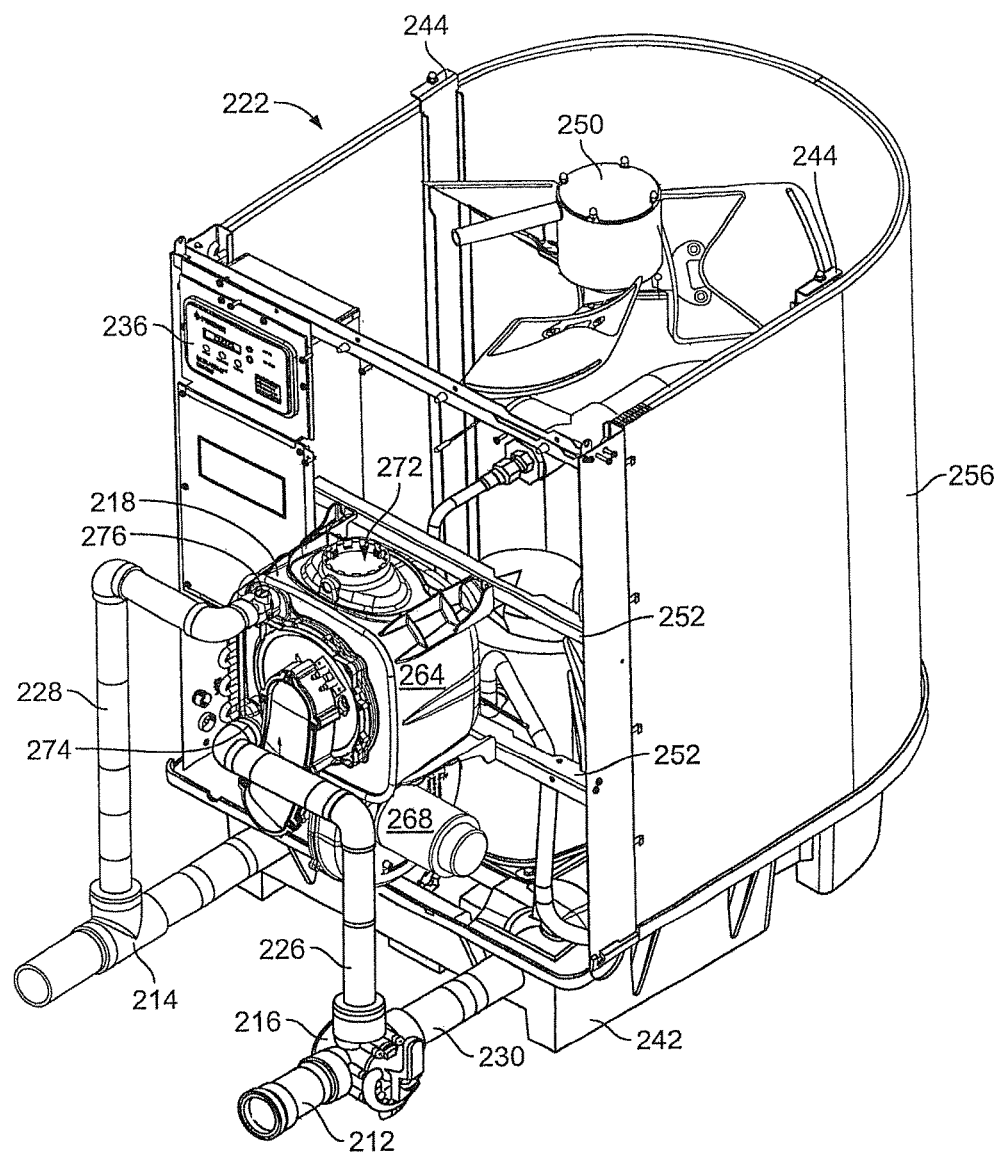
FIG. 4 is another isometric view of the hybrid heater of FIG. 2 with portions removed therefrom for clarity.

Referring now to FIG. 4, the hybrid heater 208 depicted has the upper housing portion 240, fan guard 248, and mesh screen 254 removed to reveal the refrigerant-to-air heat exchanger 256 and the fan 250 of the heat pump 222.

Figure 5:
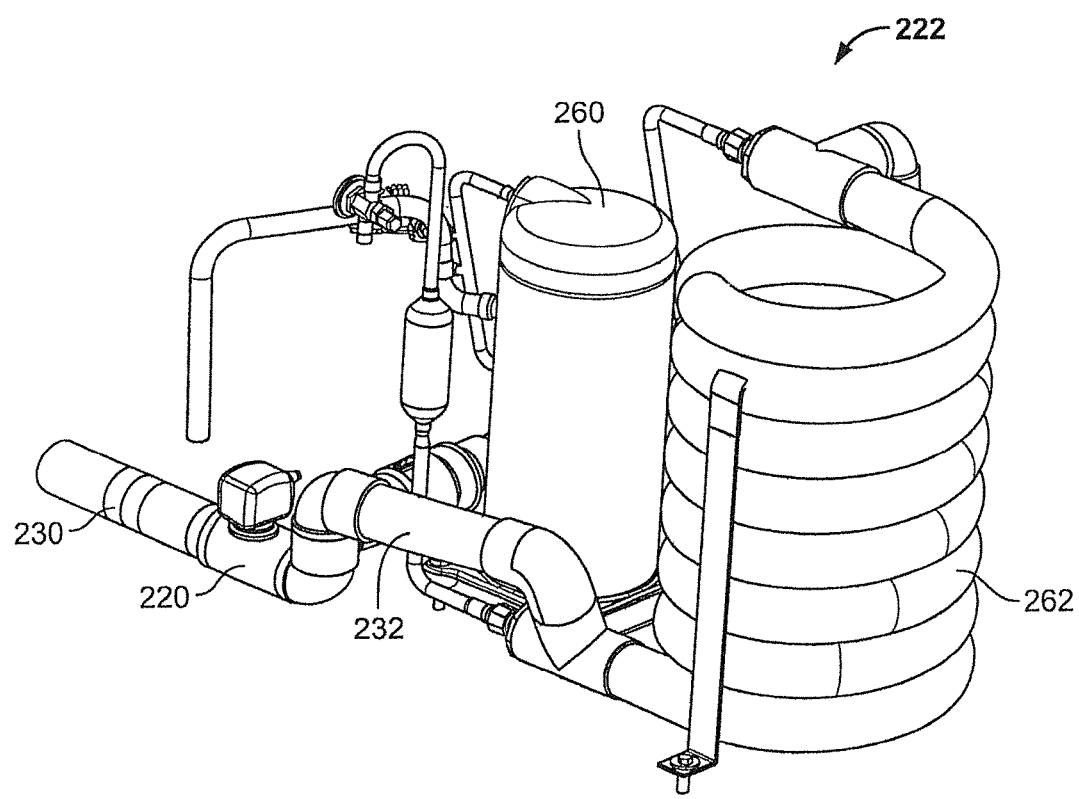
FIG. 5 is an isometric view of some of the components of a heat pump of the hybrid heater of FIG. 2.
Figure 6:
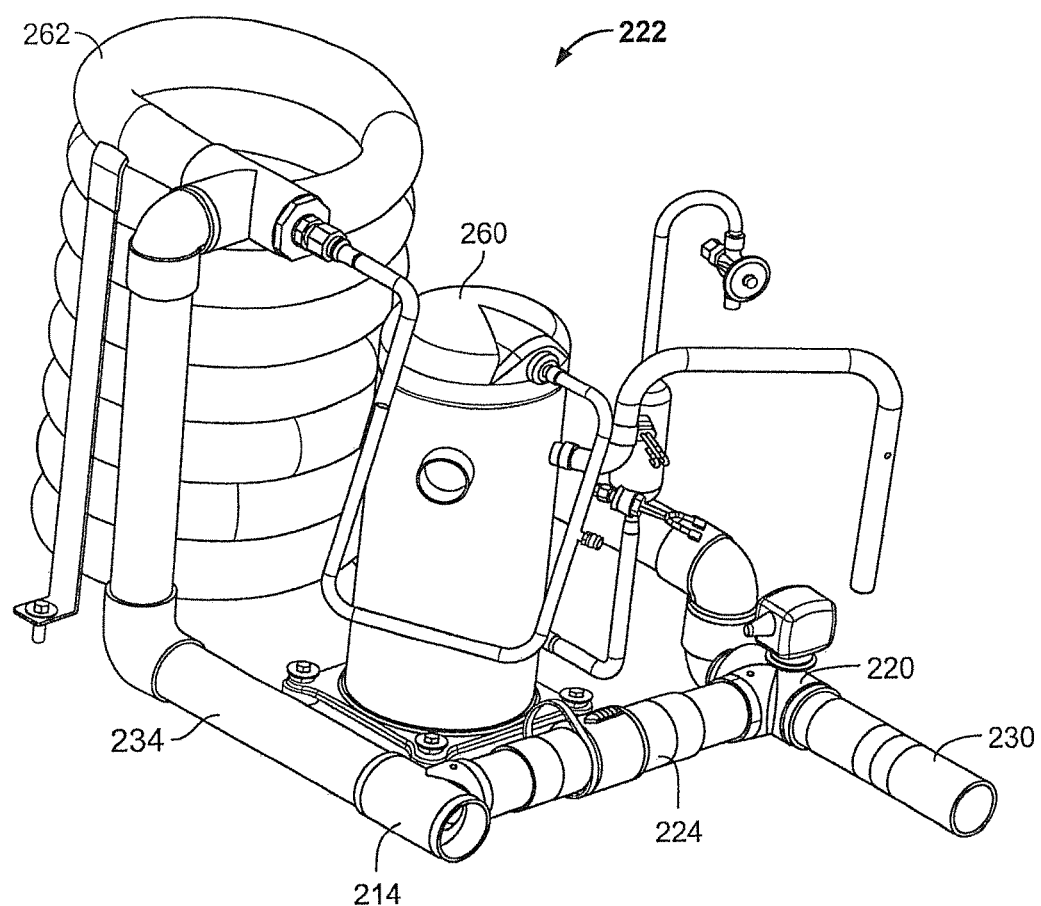
FIG. 6 is a different isometric view of the components of the heat pump depicted in FIG. 5.

FIGS. 5 and 6 depict various components of the heat pump 222 of the hybrid heater 208 with the refrigerant-to-air heat exchanger 256 and fan 250 removed for clarity. The heat pump 222 includes a compressor 260, a refrigerant-to-water heat exchanger 262, the fan 250, the refrigerant-to-air heat exchanger 256, and the associated lines (unlabeled) to allow refrigerant to flow between components of the heat pump 222 during operation.

Figure 7:
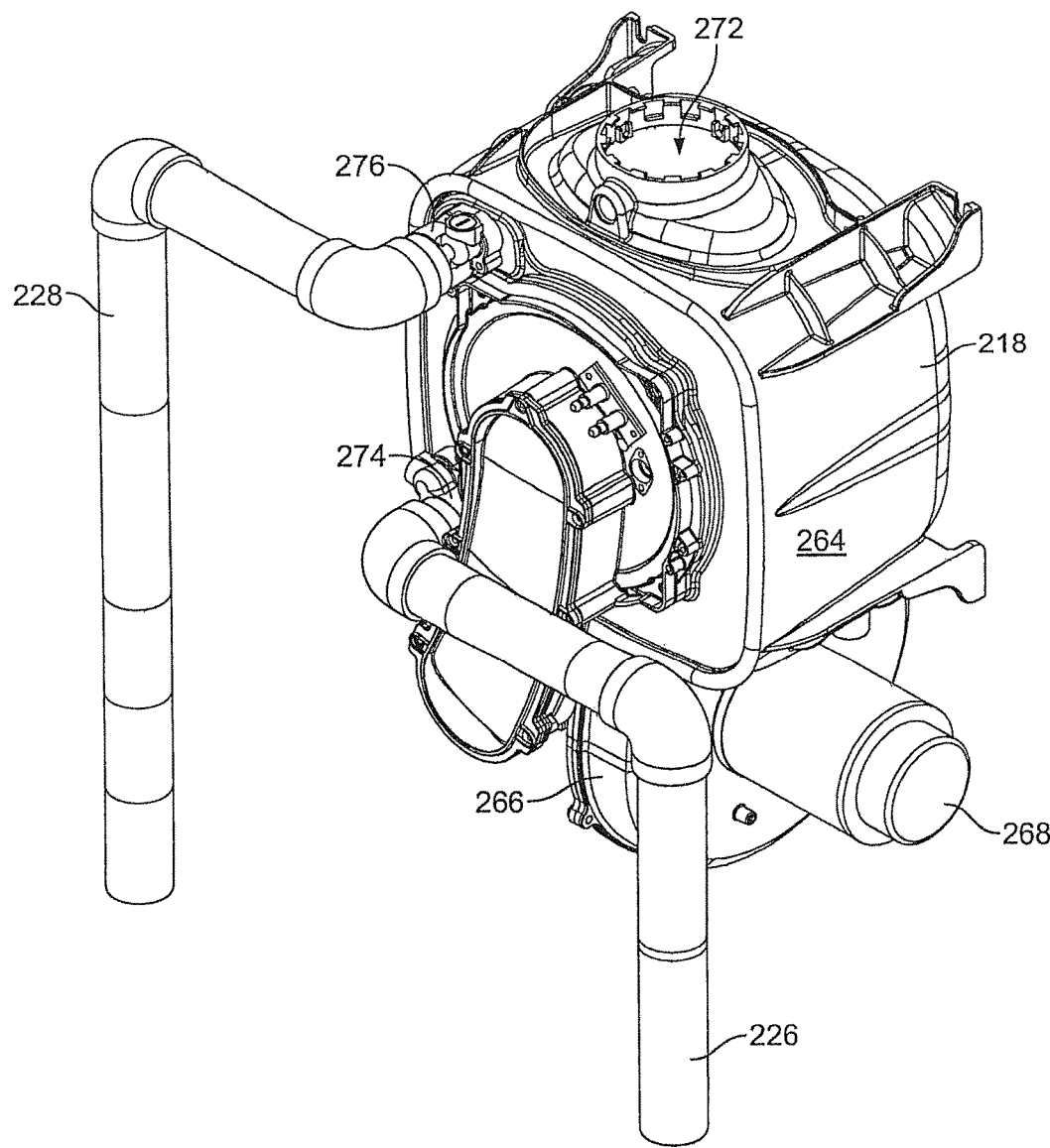
FIG. 7 is an isometric view of a gas heater of the hybrid heater of FIG. 2.
Figure 8:
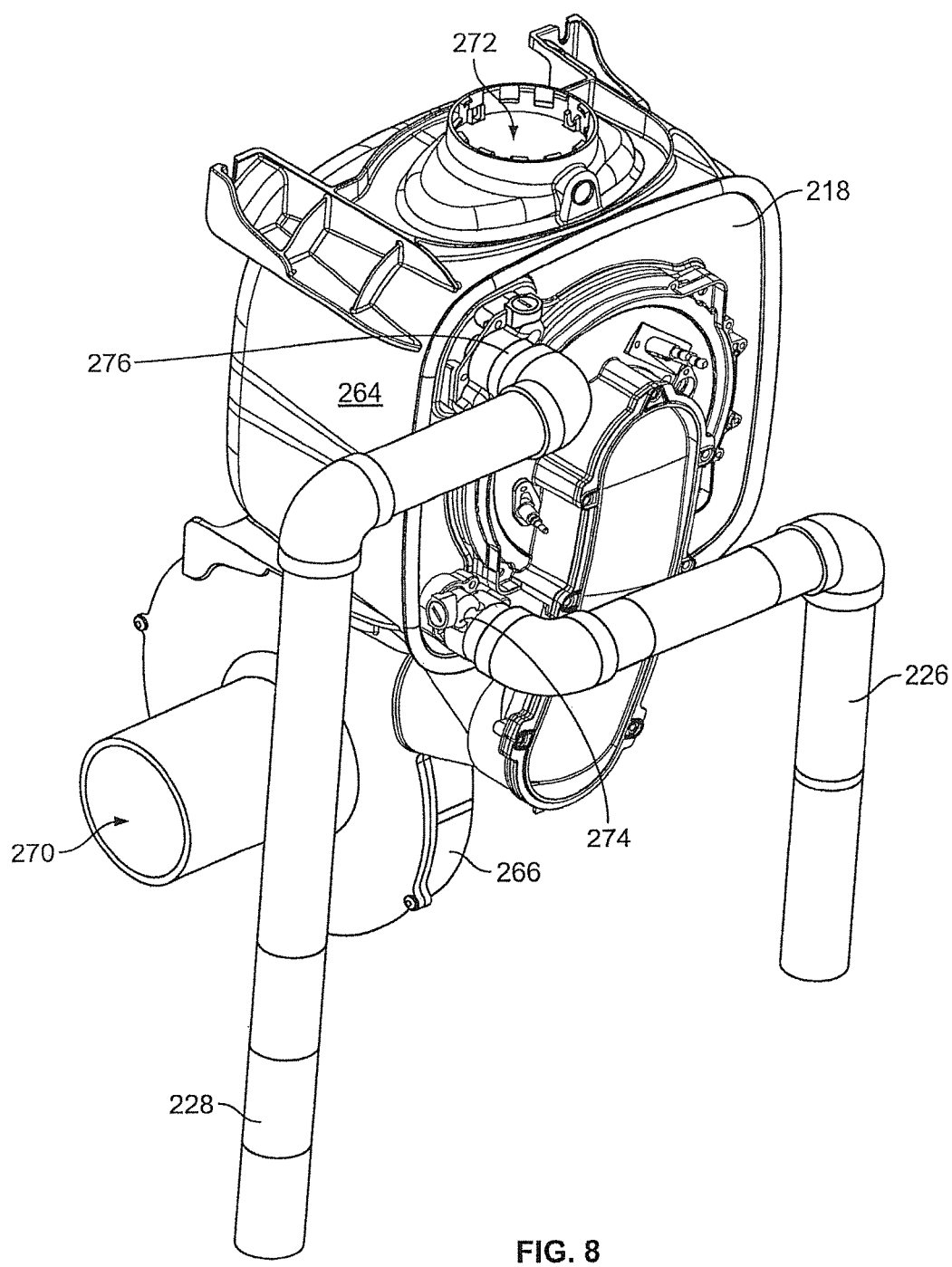
FIG. 8 is a different isometric view of the gas heater of FIG. 7.

Now turning to FIGS. 7 and 8, one embodiment of the gas heater 218 of hybrid heater 208 is depicted. The gas heater 218 includes a heater housing 264 and a blower 266, which includes an electric blower motor 268 and an blower air inlet 270. The heater housing 264 includes an exhaust port 272, a water inlet port 274, and a water outlet port 276. Contained within the heater housing is a gas burning tankless water heat exchanger (not shown).

In the embodiment depicted in FIGS. 2-4, the controller 236 controls the operation of the heat pump 222. Water enters the heat pump 222 after passing through the second valve 220 and flowing into the heat pump inlet pipe 232. The water then flows into the refrigerant-to-water heat exchanger 262 where the heat from vaporized compressed refrigerant is transferred to the water and the refrigerant condenses to a liquid. The heated water then exits the heat pump 222 through the heat pump outlet pipe 234 and enters the outlet 214. The condensed refrigerant flows into the refrigerant-to-air heat exchanger 256 to absorb heat from air pushed through the housing 210 by the fan 250. Absorbing heat vaporizes the liquid refrigerant before flowing into the compressor 260. The vaporized refrigerant is then compressed by the compressor 260 to, increase the temperature and pressure of the vaporized refrigerant before being pumped back into the refrigerant-to-water heat exchanger 262 to repeat the process. It is further contemplated that different types of refrigerant and different types of heat pumps known to one having ordinary skill in the art may be used in place of the embodiment described above.

Still referring to the embodiment depicted in FIGS. 2-4, the controller 236 controls the operation of the gas heater 218. Water flows from the first valve 216 through the gas heater inlet pipe 226 and into the gas heater water inlet port 274. The water flows from the water inlet port 274 into the gas burning heat exchanger (not shown). During the operation of the heater 218, the blower motor 268 turns a fan blade (not shown) within the blower 266 pulling in fresh air through the blower air inlet 270. The fresh air is mixed with gas within the heater housing 264 and the gas/air mixture is combusted to provide heat. The heated water then exits the heater housing 264 through the water outlet port 276 into the gas heater outlet pipe 228 to flow into the outlet 214. Exhaust gas from the heater exits through the exhaust port 272 into an exhaust pipe (not shown) that carries the exhaust gas a safe distance away from the hybrid heater 208 depending, on the type of installation. It is contemplated that other styles and types of tankless gas heaters known to one having ordinary skill in the art may be substituted for the embodiment described above.

Figure 9:
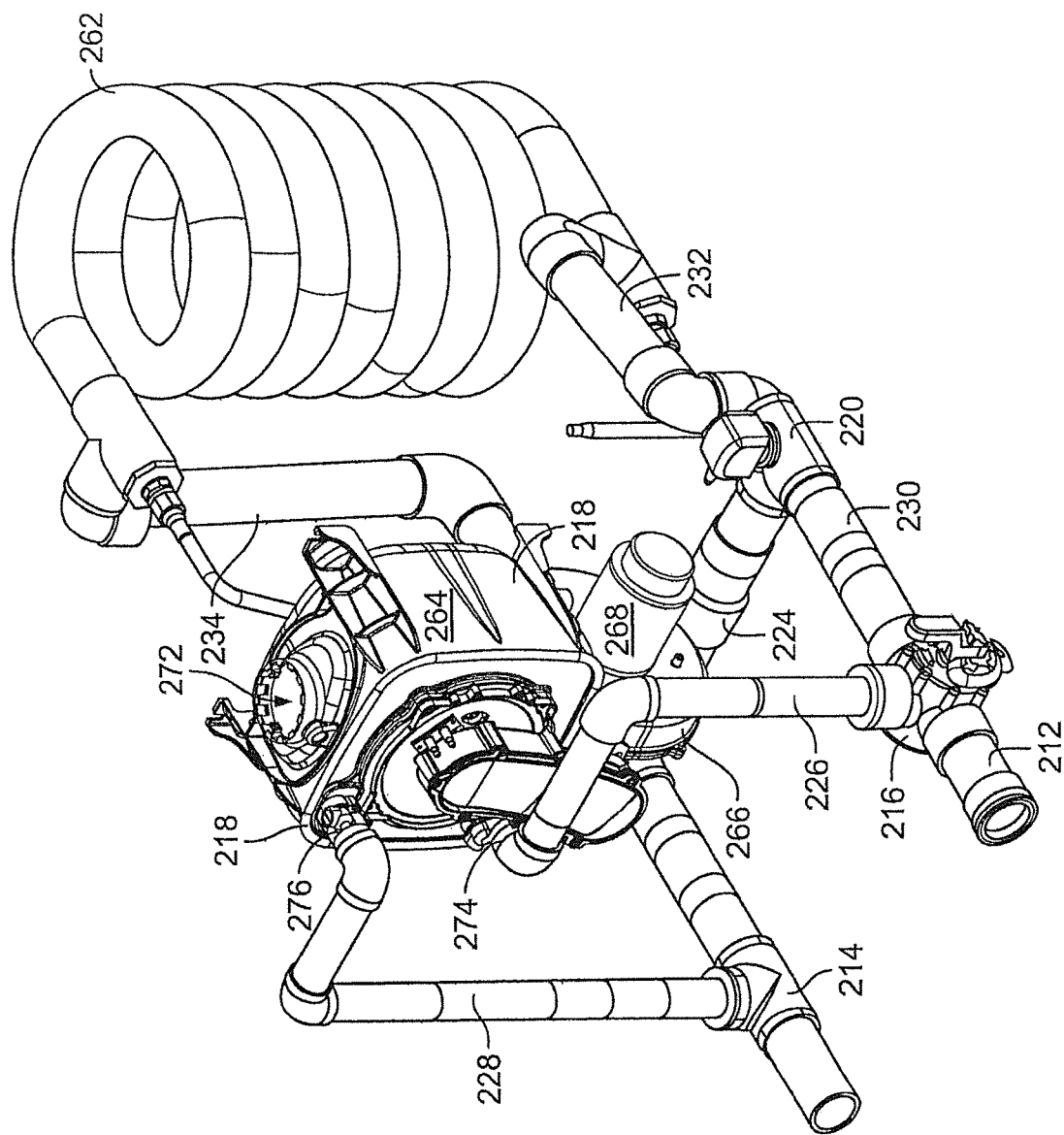
FIG. 9 is another isometric view of some of the components of the hybrid heater of FIG. 2.
Figure 10:
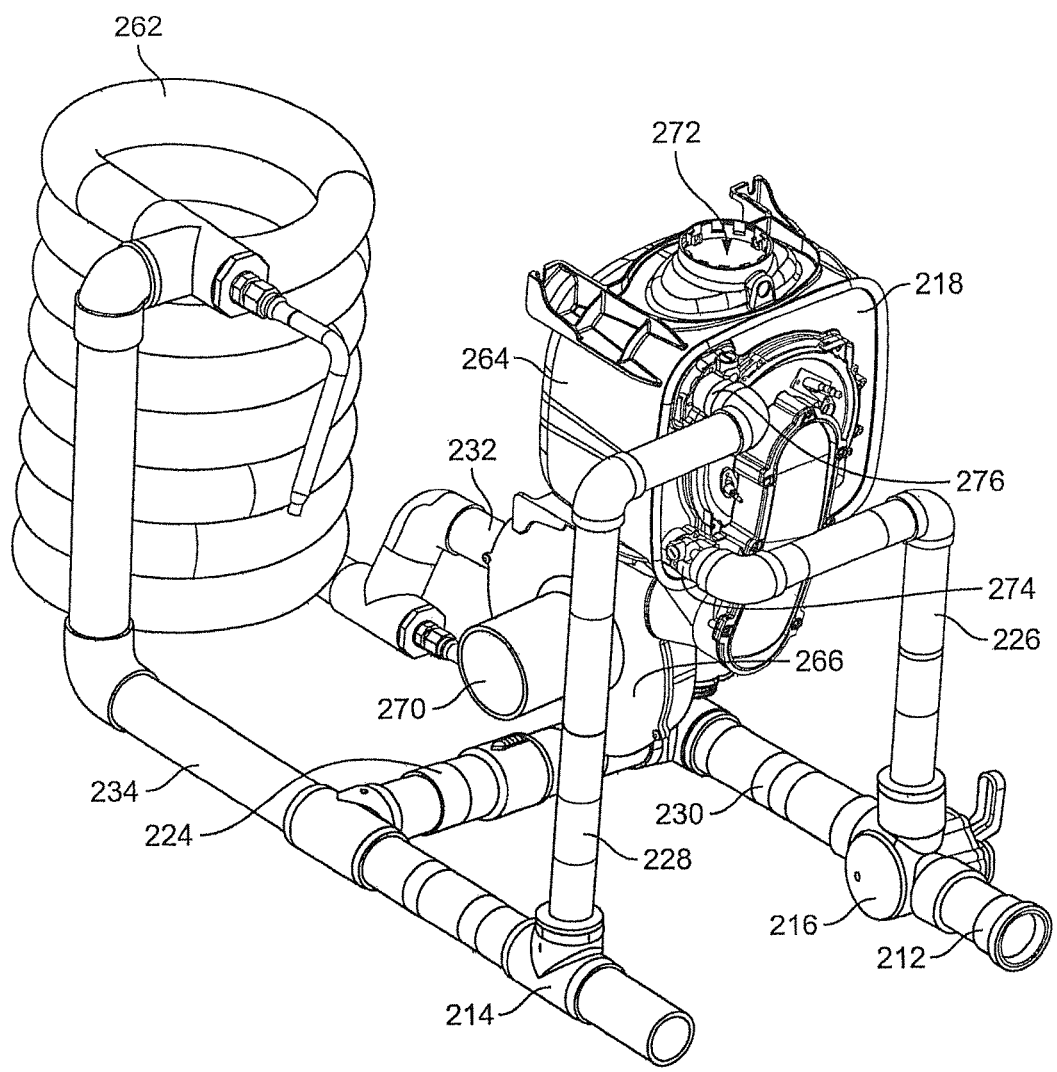
FIG. 10 is a different isometric view of the components of the hybrid heater of FIG. 9.

Referring now to FIGS. 9 and 10, the components of the hybrid heater 208 that may contain flowing water are depicted. The operator and/or the controller 236 may determine the water flow path during operation of the hybrid heater 208. The first valve 216 may be configured to direct the flow of water in three different ways. In a first configuration, the first valve 216 may direct water only to the gas heater 218 through the gas heater inlet pipe 226. Water then flows from the gas heater 218 through the gas heater outlet pipe 228 into the outlet 214 to return to the aquatic application 102. In a second configuration, the first valve 216 may direct water only to the second valve 220 through the transfer pipe 230 and prevent water from flowing to the gas heater 218. In a third configuration, the first valve 216 may direct water to flow to both the gas heater 218 and the second valve 220 simultaneously.

The second valve 220 may be configured to direct the flow of water in two different ways. In a first configuration, the second valve 220 may direct the flow of water only to the heat pump 222 through the heat pump inlet pipe 232. Water then flows out from the heat pump 222 through the heat pump outlet pipe 234 into the outlet 214 to return to the aquatic application 102. In a second configuration, the second valve 220 may direct water only to the bypass pipe 224. Water flowing through the bypass pipe may only enter the outlet 214 to return to the aquatic application 102. It is contemplated that in some embodiments, the first valve 216 and the second valve 220 are in communication with and controlled by the controller 236 automatically. Alternatively, in some embodiments, the first valve 216 and the second valve 220 may be actuated manually by the user and/or may be actuated automatically by the controller 236. The different configurations of the first valve 216 and the second valve 220 are independent of one other and allow for multiple modes of operation of the hybrid heater 208.

Figure 11:
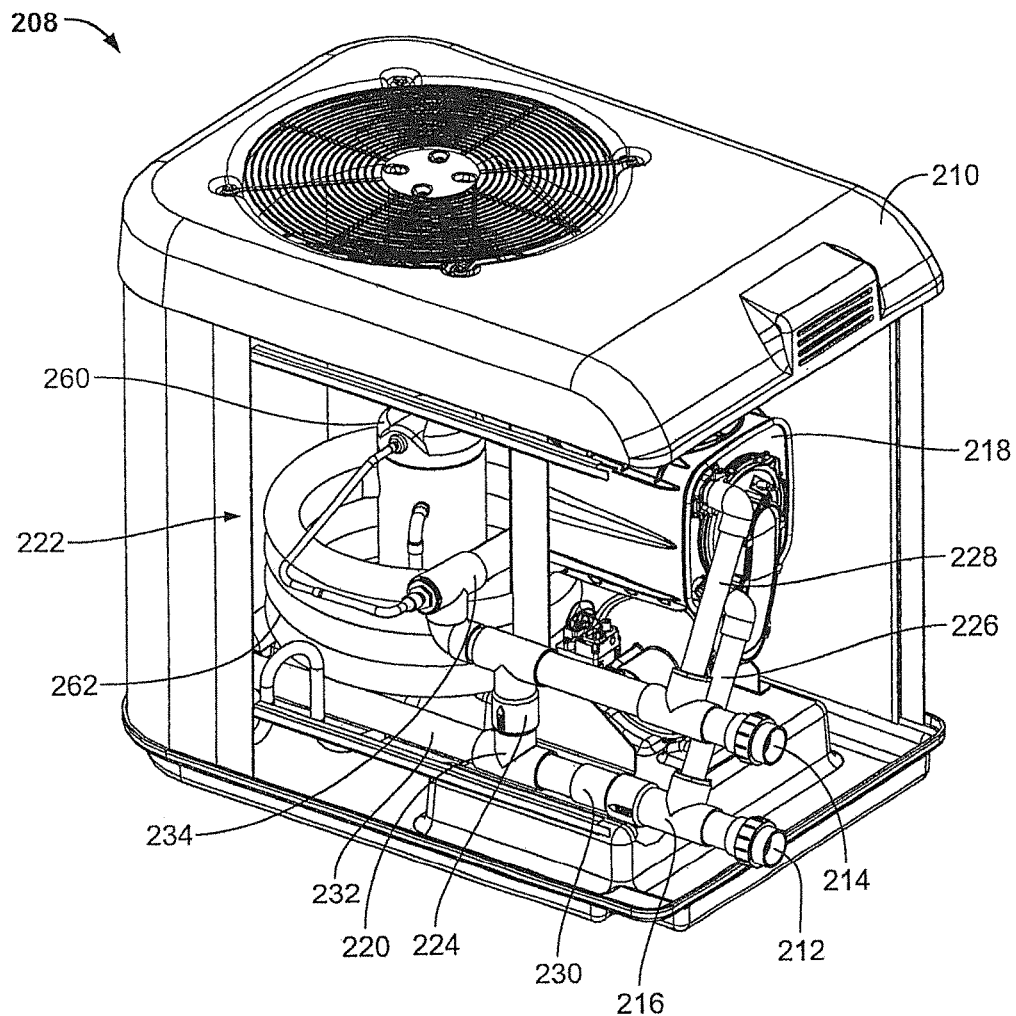
FIG. 11 is an isometric view of a further embodiment of a hybrid heater with portions removed therefrom for clarity.

Referring now to FIG. 11, a further embodiment of a hybrid heater 208 is depicted. The hybrid heater 208 includes the same or similar components as the hybrid heater of FIGS. 1-10 in a different arrangement within the housing 210 and, thus, the same reference numerals will be utilized. Similar to the embodiment of FIGS. 1-10, the hybrid heater 208 includes a housing 210, which includes an inlet 212 and an outlet 214. A first valve 216 is in fluid communication with the inlet 212 and a tankless gas heater 218, and/or a second valve 220. The second valve 220 is in fluid communication with a tankless heat pump 222, and/or a bypass pipe 224. The tankless gas heater 218 includes a gas heater inlet pipe 226, which is in fluid communication with the first valve 216, and a gas heater outlet pipe 228, which is in fluid communication with the outlet 214. The first valve 216 is in fluid communication with the second valve 220 through a transfer pipe 230. The tankless heat pump 222 includes a heat pump inlet pipe 232, which is in fluid communication with second valve 220, and a heat pump outlet pipe 234, which is in fluid communication with the outlet 214. The hybrid heater 208 also includes a controller (not shown) that may be programmable and may be in communication with one or more of the first valve 216, the tankless gas heater 218, the second valve 220, and/or the tankless heat pump 222.

The hybrid heater 208 may operate in the same fashion and/or include any of the same components as the hybrid heater disclosed in relation to FIGS. 1-10. One of the main differences between the two embodiments is the location and orientation of the inlet and outlet 212, 214 and various pipes 226, 228, 230, 232, 234. In addition, in order to reduce an overall size of the housing 210, the compressor 260 of heat pump is disposed within the heat exchanger 262.

Figure 12:
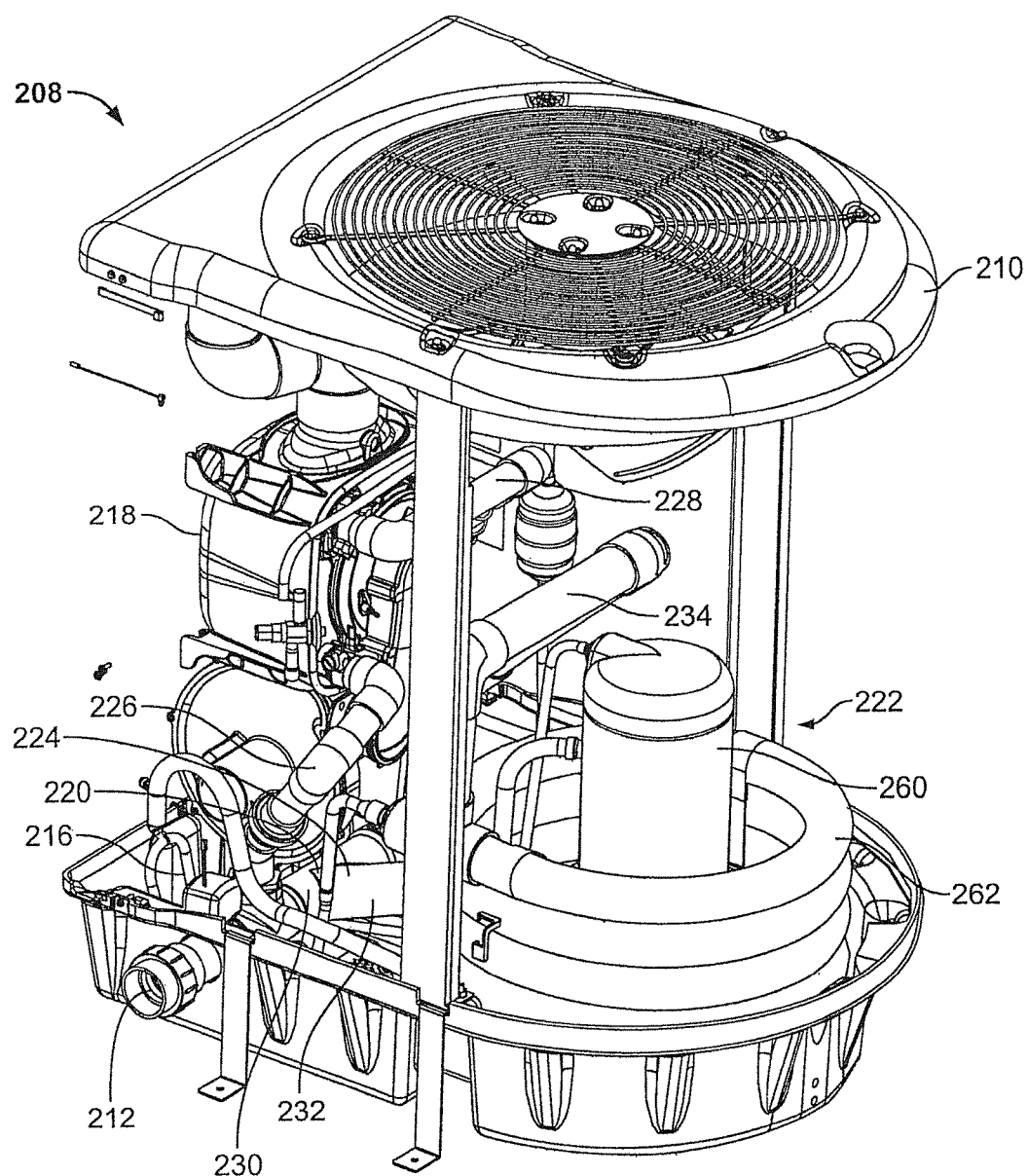
FIG. 12 is an isometric view of a first side of another embodiment of a hybrid heater with portions removed therefrom for clarity.
Figure 13:
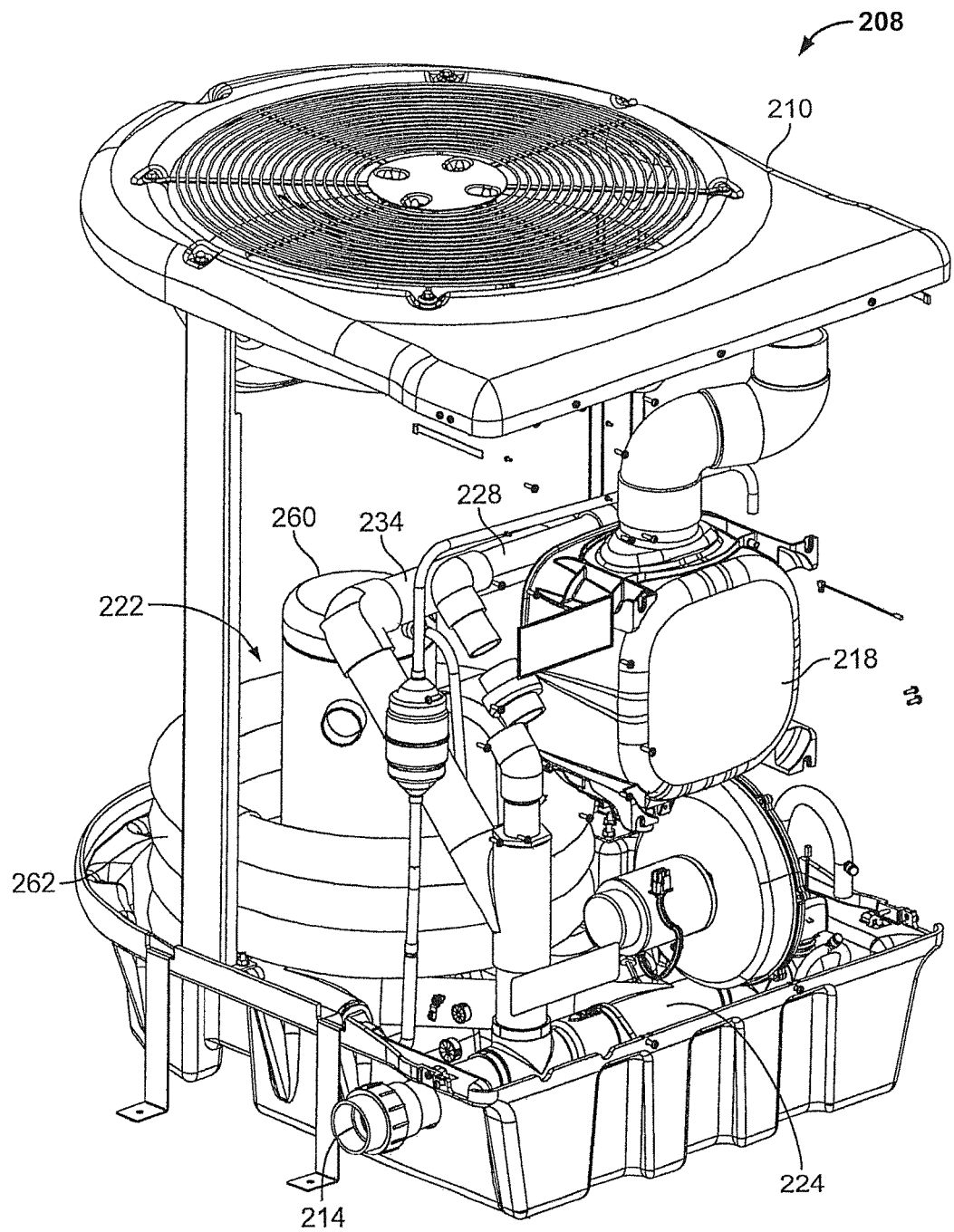
FIG. 13 is an isometric view of a second side of the hybrid heater of FIG. 12 with portions removed therefrom for clarity.

A further embodiment of a hybrid heater 208 is depicted in FIGS. 12 and 13. As with the embodiment of FIG. 11, the hybrid heater 208 includes the same or similar components as the hybrid heater of FIGS. 1-10 in a different arrangement within the housing 210 and, thus, the same reference numerals will be utilized. Similar to the embodiments of FIGS. 1-10 and 11, the hybrid heater 208 includes a housing 210, which includes an inlet 212 and an outlet 214. A first valve 216 is in fluid communication with the inlet 212 and a tankless gas heater 218, and/or a second valve 220. The second valve 220 is in fluid communication with a tankless heat pump 222, and/or a bypass pipe 224. The tankless gas heater 218 includes a gas heater inlet pipe 226, which is in fluid communication with the first valve 216, and a gas heater outlet pipe 228, which is in fluid communication with the outlet 214. The first valve 216 is in fluid communication with the second valve 220 through a transfer pipe 230. The tankless heat pump 222 includes a heat pump inlet pipe 232, which is in fluid communication with second valve 220, and a heat pump outlet pipe 234, which is in fluid communication with the outlet 214. The hybrid heater 208 also includes a controller (not shown) that may be programmable and may be in communication with one or more of the first valve 216, the tankless gas heater 218, the second valve 220, and/or the tankless heat pump 222.

The hybrid heater 208 may operate in the same fashion and/or include any of the same components as the hybrid heaters disclosed in relation to FIGS. 1-10 and 11. One of the main differences between the present embodiments and the other embodiments disclosed herein is the location and orientation of the inlet and outlet 212, 214 and various pipes 226, 228, 230, 232, 234. In addition, similar to the embodiment of FIG. 11, in order to reduce an overall size of the housing 210, the compressor 260 of heat pump is disposed within the heat exchanger 262.

Figure 14:
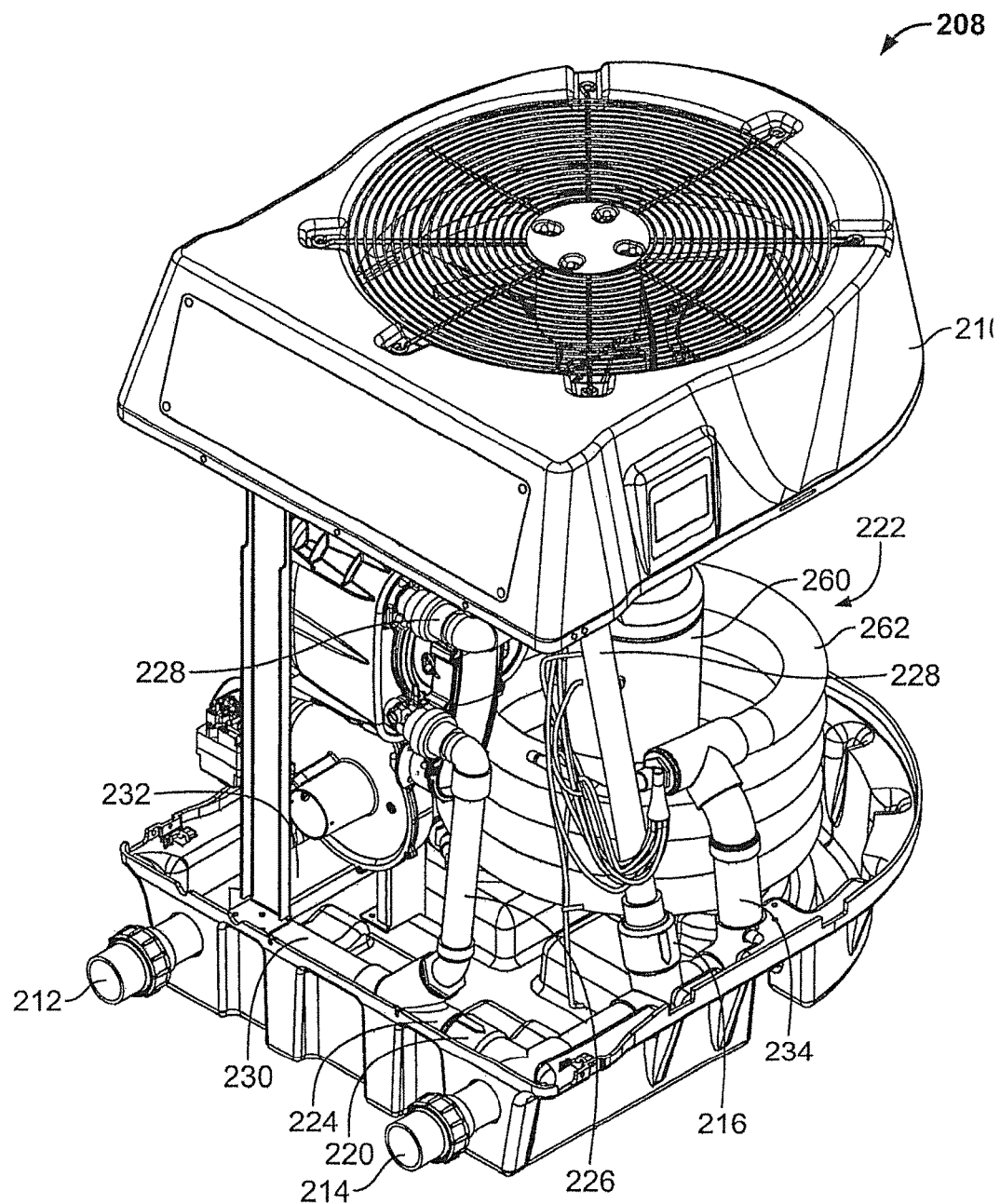
FIG. 14 is an isometric view of a first side of yet another embodiment of a hybrid heater with portions removed therefrom for clarity.
Figure 15:
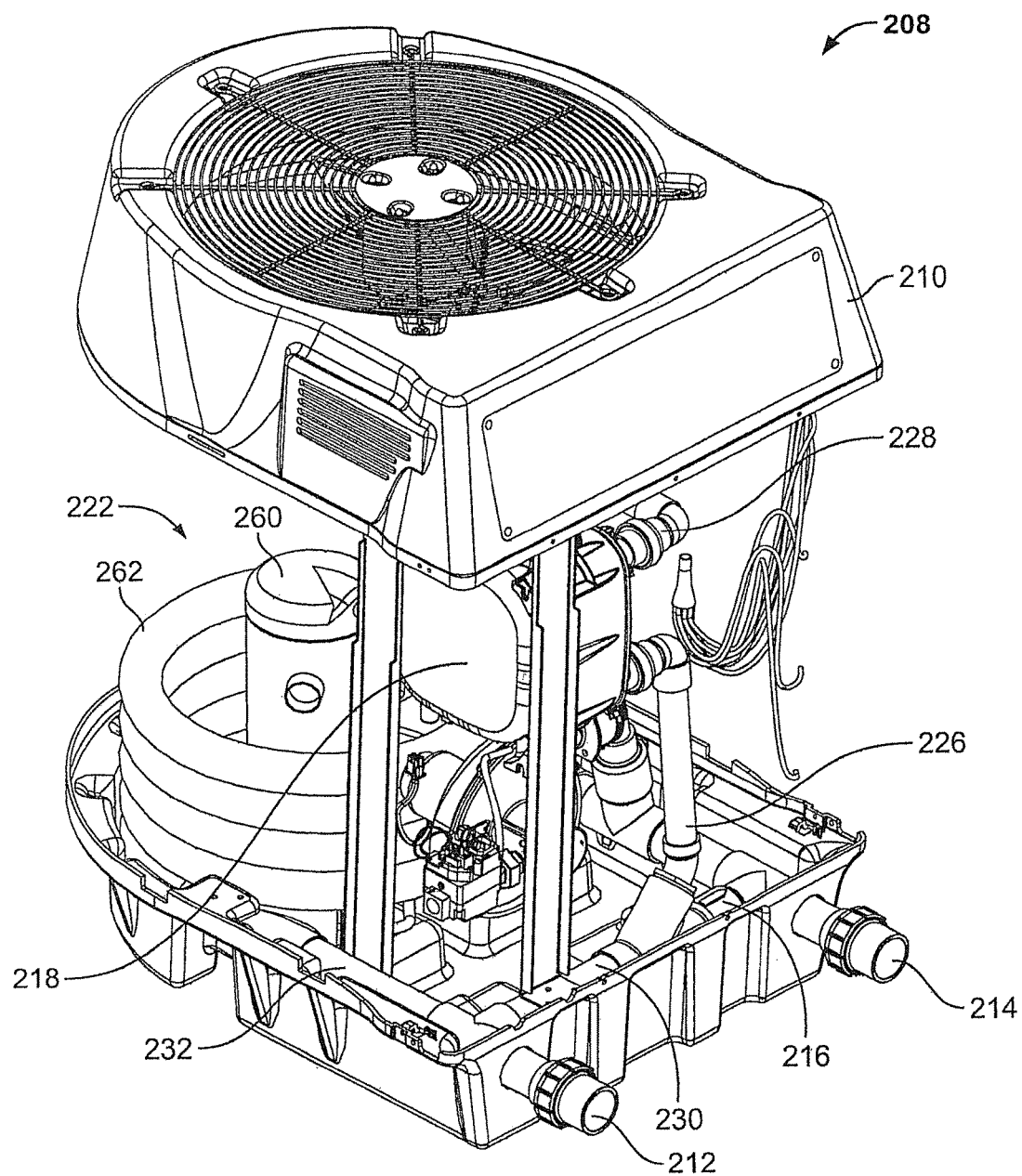
FIG. 15 is an isometric view of a second side of the hybrid heater of FIG. 14 with portions removed therefrom for clarity.

Another embodiment of a hybrid heater 208 is depicted in FIGS. 14 and 15. Similar to the previous embodiments, the hybrid heater 208 includes the same or similar components as the hybrid heater of FIGS. 1-10 in a different arrangement within the housing 210 and, thus, the same reference numerals will be utilized. Similar to the previous embodiments, the hybrid heater 208 includes a housing 210, which includes an inlet 212 and an outlet 214. A first valve 216 is in fluid communication with the inlet 212 and a tankless gas heater 218, and/or a second valve 220. The second valve 220 is in fluid communication with a tankless heat pump 222 and the valves 216 and 220 control flow of through a bypass pipe 224. The tankless gas heater 218 includes a gas heater inlet pipe 226, which is in fluid communication with the first valve 216, and a gas heater outlet pipe 228, which is in fluid communication with the outlet 214. The first valve 216 is in fluid communication with the second valve 220 through a transfer pipe 230. The tankless heat pump 222 includes a heat pump inlet pipe 232, which is in fluid communication with second valve 220, and a heat pump outlet pipe 234, which is in fluid communication with the outlet 214. The hybrid heater 208 also includes a controller (not shown) that may be programmable and may be in communication with one or more of the first valve 216, the tankless gas heater 218, the second valve 220, and/or the tankless heat pump 222.

The hybrid heater 208 may operate in the same fashion and/or include any of the same components as the hybrid heaters disclosed in relation to FIGS. 1-10, 11, and 12-13. One of the main differences between the present embodiments and the other embodiments disclosed herein is the location and orientation of the inlet and outlet 212, 214 and various pipes 226, 228, 230, 232, 234. In addition, similar to the embodiments of FIGS. 11 and 12-13, in order to reduce an overall size of the housing 210, the compressor 260 of heat pump is disposed within the heat exchanger 262.

It is contemplated that different types of valves than the types disclosed may be employed in any of the embodiments disclosed. For example, spring loaded check valves may be used in place of the first valve 216 and/or the second valve 220. One advantage of using a combination of check valves may be to provide a minimum flow at all times through the gas heater 218 and/or the heat pump 222. It is also contemplated that multiple types of valves may be used in different combinations to provide different configurations of water flow dependent on the capabilities of the system.

Any of the hybrid heaters 208 disclosed herein may enable different modes of operation that benefit the user/operator. The controller 236 may monitor at least the temperature of the water in the inlet 212 by various sensors, gauges, and the like. A set point temperature 280 may be stored within the memory of the controller 236. During operation of the hybrid heater 208, the controller 236 may compare the set point temperature 280 to at least the temperature of the water in the inlet 212. It is contemplated that during operation of the hybrid heater 208, the controller 236 may include programming to allow thermostat-like functioning during the different modes of operation as understood by one having ordinary skill in the art to prevent unnecessary activation and/or deactivation of the hybrid heater 208. In some embodiments, a physical thermostat (not shown) may be in signal communication with the controller 236. In other embodiments, the controller programming may include one or more timers, delays, or other techniques or technologies to prevent undesirable cycling of the hybrid heater 208.

A first mode of operation or gas heater only mode 290, uses only the gas heater 218 to heat water. A second mode of operation or heat pump only mode 292, uses only the heat pump 222 to heat water. A third mode of operation or boost mode 294 includes using both the gas heater 218 and the heat pump 222 simultaneously. In boost mode 294, water flows through both the heat pump 222 and the gas heater 218 in a parallel-like configuration. A fourth mode of operation or hybrid mode 296 includes using the heat pump 222 as a primary heater and the gas heater 218 as a secondary heater. The controller 236 may configure the first valve 216 and the second valve 220 to flow water through the heat pump 222 for primary heating and flow water through the gas heater 218 as needed. A fifth mode of operation or bypass mode includes the first valve 216 and the second valve 220 configured to only flow water through the bypass pipe 224 when heating the water is not necessary. In any of the modes of operation, the controller 236 may activate the gas heater 218 and/or heat pump 222 accordingly and/or may configure the first valve 216 and/or second valve 220 accordingly. All the modes of operation will be discussed in detail below.

Figure 16:
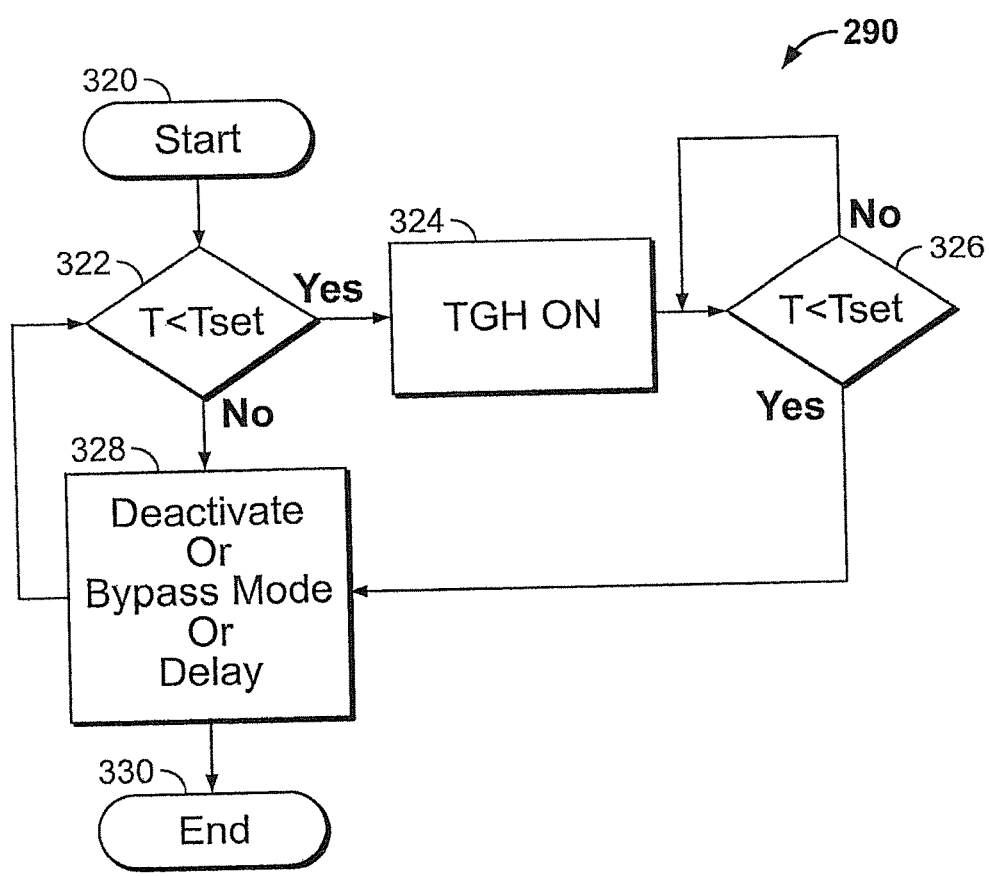
FIG. 16 is a flow chart of a first node of operation of any of the hybrid heaters disclosed herein.

During the first mode of operation or gas heater only mode 290, the controller 236 (see FIGS. 2-4) or user may activate the gas heater 218. A flow chart depicting the gas heater only mode 290 is depicted in FIG. 16. After the start block 320 of the gas heater only mode 290, with the first block 322, the controller 236 compares the temperature (T) of the water in the inlet 212 to the set point temperature 280 (Tset). If the temperature (T) is below the set point temperature 280 (Tset), the gas heater 218 is activated by the controller 236 in block 324. The difference between the inlet 212 temperature (T) and the set point temperature 280 (Tset) sufficient to trigger the controller 236 to activate the gas heater 218 may be configured by the user or it may be a default setting in the controller 236 programming. While the gas heater 218 is operating, the controller 236 will monitor the inlet 212 temperature (T) and compare it with the set point temperature 280 (Tset) in block 326. If the temperature (T) of the inlet 212 is below the set point temperature 280 (Tset), the controller 236 continues to monitor the temperature (T) of the inlet 212 while the gas heater 218 operates. If the temperature (T) of the inlet 212 is equal to or above the set point temperature 280 (Tset), the controller 236 proceeds to block 328 and deactivates the gas heater 218. The controller 236 will then wait for a specific period of time or proceed back to block 322 until the inlet 212 temperature (T) drops below the set point temperature 280 (Tset) as described above or the gas heater only mode 290 is ended with block 330.

Still referring to FIG. 16, after the start block 320, the inlet 212 temperature (T) may be at or above the set point temperature 280 (Tset). The controller 236 would then proceed directly to block 328. It is contemplated that in some embodiments, water is continuously flowing through the gas heater 218 while the hybrid heater 208 is in the gas heater only mode 290. In an alternative embodiment, when the controller 236 reaches block 328, the controller 236 may configure the first valve 216 and the second valve 220 to direct the water to flow through the bypass pipe 224 during periods when the gas heater 218 is deactivated. It is also contemplated that the start 320 and end 330 of the gas heater 218 only mode 290 may be triggered by the user or the controller 236 in various circumstances.

Figure 17:
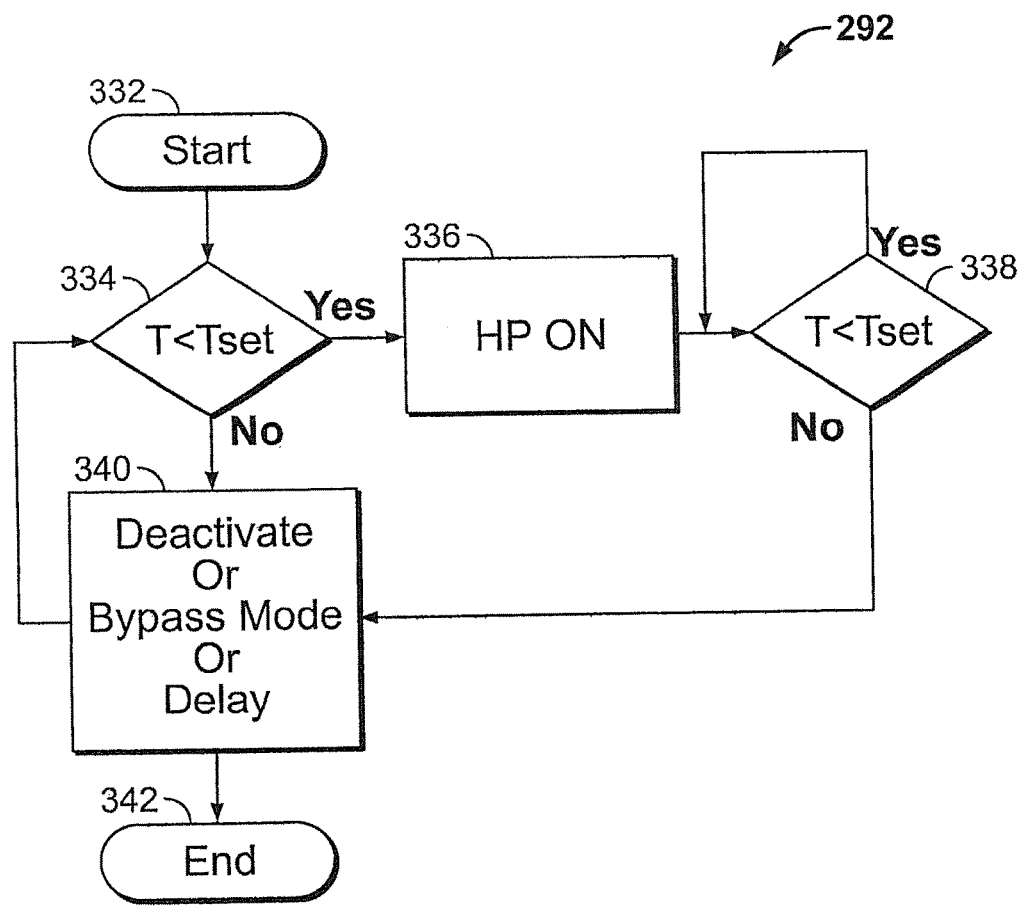
FIG. 17 is a flow chart of a second mode of operation of any of the hybrid heaters disclosed herein.

During the second mode of operation or heat pump only mode 292, the controller 236 or user may activate only the heat pump 222. A flow chart depicting the heat pump only mode 292 is depicted in FIG. 17. After the start block 332 of the heat pump only mode 292, with the first block 334, the controller 236 compares the temperature (T) of the water in the inlet 212 to the set point temperature 280 (Tset). If the temperature (T) is below the set point temperature 280 (Tset), the heat pump 222 is activated by the controller 236 in block 336. The difference between the inlet 212 temperature (T) and the set point temperature 280 (Tset) sufficient to trigger the controller 236 to activate the heat pump 222 may be configured by the user or it may be a default setting in the controller 236 programming. While the heat pump 222 is operating, the controller 236 will monitor the inlet 212 temperature (T) and compare it with the set point temperature 280 (Tset) in block 338. If the temperature (T) of the inlet 212 is below the set point temperature 280 (Tset), the controller 236 continues to monitor the temperature (T) of the inlet 212 while the heat pump 222 operates. If the temperature (T) of the inlet 212 is equal to or above the set point temperature 280 (Tset), the controller 236 proceeds to block 340 and deactivates the heat pump 222. The controller 236 will then wait for a specific period of time or proceed back to block 334 until the inlet 212 temperature (T) drops below the set point temperature 280 (Tset) as described above or the heat pump only mode 292 is ended with block 342.

Still referring to FIG. 17, after the start block 332, the inlet 212 temperature (T) may be at or above the set point temperature 280 (Tset). The controller 236 would then proceed directly to block 340. It is contemplated that in some embodiments, water is continuously flowing through the heat pump 222 while the hybrid heater 208 is in the heat pump only mode 292. In an alternative embodiment, when the controller 236 reaches block 340, the controller 236 may configure the first valve 216 and the second valve 220 to direct the water to flow through the bypass pipe 224 during periods when the heat pump 222 is deactivated. It is also contemplated that the start 332 and end 342 of the heat pump only mode 292 may be triggered by the user or the controller 236 in various circumstances.

Figure 18:
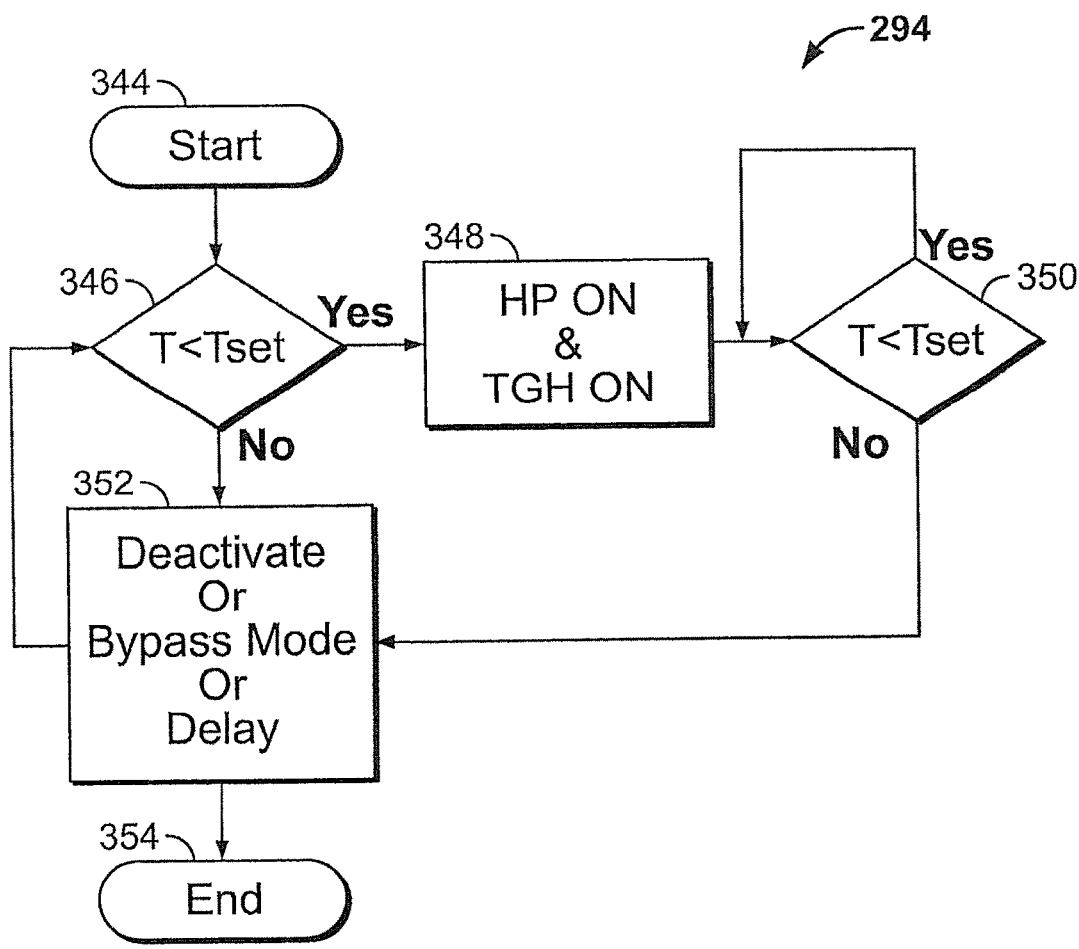
FIG. 18 is a flow chart of a third mode of operation of any of the hybrid heaters disclosed herein.

During the third mode of operation or boost mode 294, the controller 236 or user may activate the gas heater 218 and the heat pump 222 at the same time. A flow chart depicting the boost mode 294 is depicted in FIG. 18. After the start block 344 of the gas heater only mode 290, at the first block 346, the controller 236 compares the temperature (T) of the water in the inlet 212 to the set point temperature 280 (Tset). If the temperature (T) is below the set point temperature 280 (Tset), the gas heater 218 and the heat pump 222 are activated by the controller 236 in block 348. The difference between the inlet 212 temperature (T) and the set point temperature 280 (Tset) sufficient to trigger the controller 236 to activate the gas heater 218 and the heat pump 222 may be configured by the user or it may be a default setting in the controller 236 programming. While the gas heater 218 and the heat pump 222 are operating, the controller 236 will monitor the inlet 212 temperature (T) and compare it with the set point temperature 280 (Tset) in block 350. If the temperature (T) of the inlet 212 is below the set point temperature 280 (Tset), the controller 236 continues to monitor the temperature (T) of the inlet 212 while the gas heater 218 and the heat pump 222 operate. If the temperature (T) of the inlet 212 is equal to or above the set point temperature 280 (Tset), the controller 236 proceeds to block 352 and deactivates the gas heater 218 and the heat pump 222. The controller 236 will then wait for a specific period of time or proceed back to block 346 until the inlet 212 temperature (T) drops below the set point temperature 280 (Tset) as described above or the boost mode 294 is ended with block 354.

Still referring to FIG. 18, after the start block 344, the inlet 212 temperature (T) may be at or above the set point temperature 280 (Tset). The controller 236 would then proceed directly to block 352. It is contemplated that in some embodiments, water is continuously flowing through the gas heater 218 and the heat pump 222 while the hybrid heater 208 is in the boost mode 294. In an alternative embodiment, when the controller 236 reaches block 352, the controller 236 may configure the first valve 216 and the second valve 220 to direct the water to flow through the bypass pipe 224 during periods when the gas heater 218 and the heat pump 222 are deactivated. It is also contemplated that the start 344 and end 354 of the boost mode 294 may be triggered by the user or the controller 236 in various circumstances. It is further contemplated that boost mode 294 would provide the maximum heat output of the hybrid heater 208 and thus reach the set point temperature 280 (Tset) the fastest of all the operational modes.

Figure 19:
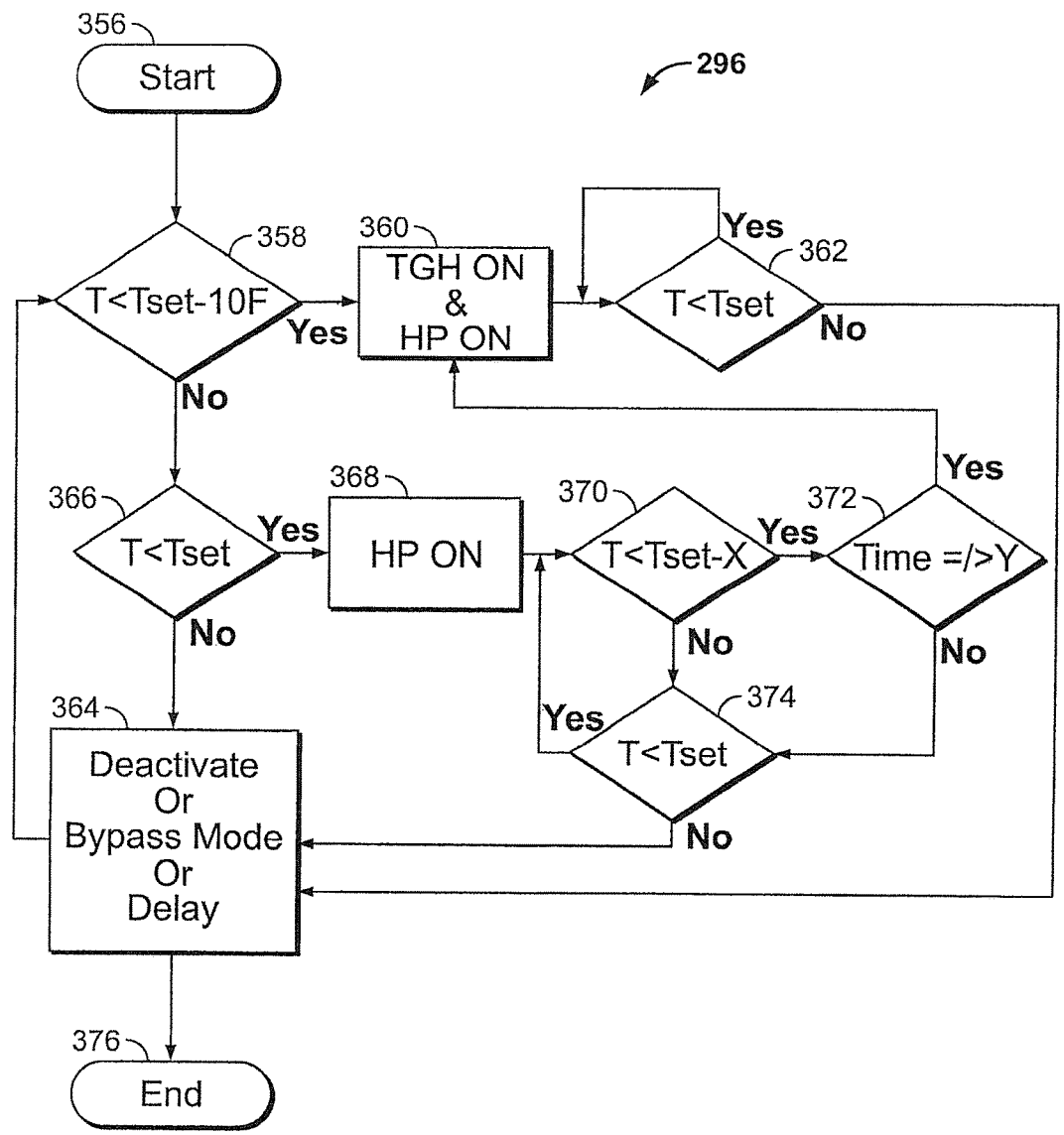
FIG. 19 is a flow chart of a fourth mode of operation of any of the hybrid heaters disclosed herein.

FIG. 19 depicts a flow chart for a fourth mode of operation or hybrid mode 296. After the start block 356 of hybrid mode 296, with the first block 358, the controller 236 compares the temperature (T) of the water in the inlet 212 to the set point temperature 280 (Tset). If the temperature (T) is 10 degrees or more below the set point temperature 280 (Tset), the gas heater 218 and the heat pump 222 are activated by the controller 236 in block 360. While the gas heater 218 and the heat pump 222 are operating, the controller 236 will monitor the inlet 212 temperature (T) and compare it with the set point temperature 280 (Tset) in block 362. If the temperature (T) of the inlet 212 is below the set point temperature 280 (Tset), the controller 236 continues to monitor the temperature (T) of the inlet 212 while the gas heater 218 and the heat pump 222 operate. If the temperature (T) of the inlet 212 is equal to or above the set point temperature 280 (Tset), the controller 236 proceeds to block 364 and deactivates the gas heater 218 and the heat pump 222. If the inlet 212 temperature (T) is not 10 degrees or more below the set point temperature 280 (Tset), the controller proceeds to block 366. The controller 236 then compares the inlet 212 temperature (T) to the set point temperature 280 (Tset). If the temperature (T) is below the set point temperature 280 (Tset), the heat pump 222 is activated by the controller 236 in block 368. During hybrid mode 296, when the heat pump 222 is activated in block 368, the controller 236 monitors the temperature (T) in block 370 differently than in the other modes of operation. If the temperature (T) is more than a value X degrees below the set point temperature 280 (Tset), the controller proceeds to block 372, where the time the heat pump 222 has been activated is compared to a value Y. If the heat pump 222 has been operating for a time period equal to or more than the value Y, the controller 236 proceeds to block 360 and turns on the gas heater 218 also. The controller 236 then proceeds as described above. If at block 372, the time the heat pump 222 has been operating is less than the value Y, the controller proceeds to block 374, where if the temperature (T) of the inlet 212 is below the set point temperature 280 (Tset), the controller 236 proceeds back to block 370. When the temperature (T) is equal to or above the set point temperature (Tset) in block 374, the controller 236 proceeds to block 364 and deactivates the heat pump 222. The controller 236 will then wait for a specific period of time or proceed back to block 358. Hybrid mode 296 may continue until the user or controller 236 ends the mode and the controller proceeds to the end block 376.

Still referring to FIG. 19, after the start block 356, the inlet 212 temperature (T) may be at or above the set point temperature 280 (Tset). The controller 236 would then proceed to block 364. It is contemplated that in some embodiments, water only flows through the heat pump 222 and the gas heater 218 when the respective units are activated. When the controller 236 reaches block 364, the controller 236 may configure the first valve 216 and the second valve 220 to direct the water to flow through the bypass pipe 224 during periods when the gas heater 218 and the heat pump 222 are deactivated.

In some embodiments, the value X and the value Y may be programmed or selected by a user. Alternatively, the value X and the value Y may be pre-programmed into the controller 236. In further embodiments, the value X and the value Y may be adjusted by the controller 236 from the programmed or selected values depending on environmental and/or other conditions. One advantage of hybrid mode 296 is that the hybrid heater 208 will maintain the water temperature of the aquatic application 102 even if the environmental conditions results in less than optimal operating conditions for the heat pump 222, while still attempting to maximize the efficiency of the electricity consumed by the heat pump 222 and minimize the gas consumed by the gas heater 218.

During a fifth mode of operation or bypass mode, the controller 236 or operator configures the first valve 216 and the second valve 220 so that water only flows through the bypass pipe 224. During this mode of operation the heat pump 222 and the gas heater 218 are deactivated and no water is flowing through either. In one embodiment, bypass mode 298 may be a subroutine of the other modes of operation of the hybrid heater 208. Once the set point temperature 280 (Tset) is achieved in any of the other modes, the controller 236 may enter the hybrid heater 208 into bypass mode 298. The hybrid heater 208 may remain in bypass mode 298 until the controller 236 determines the inlet 212 temperature (T) is no longer at or above the set point temperature 280 (Tset). The controller 236 may then enter the hybrid heater 208 into the previously selected mode of operation or another mode of operation depending on environmental conditions or other factors. Alternatively, during the fifth mode of operation or bypass mode, the controller 236 may deactivate both the gas heater 218 and the heat pump 222 and the valves 216, 220 would provide at least a minimum flow of water to the gas heater 218 and heat pump 222, respectively.

As noted above, the valves 216, 220 regulate an amount of water that is transferred to each of the gas heater 218 and the heat pump 222, respectively. In some embodiments, when the gas heater 218 and/or the heat pump 222 are deactivated, the valves 216, 220, respectively, may provide a minimum flow to the gas heater 218 and/or the heat pump 222. In a scenario when less than a full flow is necessary to the heat pump 222, the valve 220 additionally directs any excess water flow through the bypass pipe 224 toward the outlet 214.

It is further contemplated that the mode of operation may be chosen by the user or the controller 236. The controller 236 may be configured to receive input signals from a variety of sensors and sources. The input signals may characterize all of the relevant information and data relative to the aquatic system 100. The controller 236 may be configured to also receive information relative to gas and electric utility costs either manually entered by a user or via an internet connection. The controller 236 may also be configured to receive weather and temperature information from sensors in communication with the controller 236 or via an internet connection. It is further contemplated that the controller 236 may be configured to process some or all of the data received to choose the most appropriate mode of operation of the hybrid heater 208. The mode of operation may be selected by the controller 236 dependent on factors chosen by the user such as, for example, minimizing operational cost or maintaining a tight tolerance on the set point temperature 280.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A heater, comprising:
a housing;
a first tankless heater;
a second tankless heater; and
first and second flow directing elements, the first flow directing element in communication with the first tankless heater and the second flow directing element and the second flow directing element in communication with the second tankless heater, wherein the first flow directing element is configured to direct flow in one of the following manners at any given time: (1) only to the first tankless heater, (2) to the second flow directing element and, thus, the second tankless heater and bypassing the first tankless heater, or (3) to the first tankless heater and the second flow directing element.

2. The heater of claim 1, wherein the first tankless heater is mounted to the housing and the second tankless heater is mounted within the housing.

3. The heater of claim 1, wherein both the first tankless heater and the second tankless heater are mounted within the housing.

4. The heater of claim 1, wherein the first tankless heater is an electric heat pump and the second tankless heater is a gas fired heat exchanger.

5. The heater of claim 1, further including a controller configured to monitor a temperature of water entering an inlet of the heater and controls the first and second flow directing elements dependent upon the temperature of the water entering the inlet.

6. The heater of claim 1, wherein the second flow directing element is configured to direct flow in one of the following manners at any given time: (1) only to the second tankless heater or (2) only to a bypass pipe, which bypasses the second tankless heater.

7. The heater of claim 1, wherein the first and second flow directing elements are valves.

8. The heater of claim 1, wherein the first and second flow valves are spring-loaded check valves.

9. The heater of claim 1, wherein the first and second valves are three-way valves.

10. The heater of claim 1, further including a single inlet entering the housing and in communication with both the first and second tankless heaters and a single outlet exiting the housing and in communication with both the first and second tankless heaters.

11. A heater, comprising;
a housing;
a first tankless heater;
a second tankless heater; and
a first and second flow directing elements, the first flow directing element in communication with the first tankless heater and the second flow directing element and the second flow directing element in communication with the second tankless heater;
a controller in communication with the first and second tankless heaters and the first and second flow directing elements, the controller configured to control the first and second flow directing elements to control flow to one or both of the first and second tankless heaters.

12. The heater of claim 11, wherein the controller is configured to receive input signals relating to environmental conditions around the heater and an aquatic system in which the heater is installed.

13. The heater of claim 11, wherein the controller may be programmed remotely by a user.

14. The heater of claim 11, wherein the controller is configured to communicate with at least one component of an aquatic system in which the heater is installed.

15. The heater of claim 11, wherein both the first tankless heater and the second tankless heater are mounted within the housing.

16. The heater of claim 11, wherein the first tankless heater is an electric heat pump and the second tankless heater is a gas fired heat exchanger.

17. The heater of claim 11, wherein the controller is configured to monitor a temperature of water entering an inlet of the heater and controls the first and second flow directing elements dependent upon the temperature of the water entering the inlet.

18. The heater of claim 11, wherein the first flow directing element is configured to direct flow in one of the following manners at any given time: (1) only to the first tankless heater, (2) to the second flow directing element and, thus, the second tankless heater and bypassing the first tankless heater, or (3) to the first tankless heater and the second flow directing element and the second flow directing element is configured to direct flow in one of the following manners at any given time: (1) only to the second tankless heater or (2) only to a bypass pipe, which bypasses the second tankless heater.

19. The heater of claim 11, wherein the first and second flow directing elements are valves.

20. The heater of claim 11, further including a single inlet entering the housing and in communication with both the first and second tankless heaters and a single outlet exiting the housing and in communication with both the first and second tankless heaters.

* * * * *